(12) United States Patent
Nakamura

(10) Patent No.: US 8,061,311 B2
(45) Date of Patent: Nov. 22, 2011

(54) VARIABLE VALVE ACTUATING APPARATUS FOR INTERNAL COMBUSTION ENGINE

(75) Inventor: Makoto Nakamura, Isehara (JP)

(73) Assignee: Hitachi, Ltd., Tokyo (JP)

( * ) Notice: Subject to any disclaimer, the term of this patent is extended or adjusted under 35 U.S.C. 154(b) by 520 days.

(21) Appl. No.: 12/076,172

(22) Filed: Mar. 14, 2008

(65) Prior Publication Data

US 2008/0257289 A1    Oct. 23, 2008

(30) Foreign Application Priority Data

Apr. 23, 2007  (JP) ................................ 2007-112559

(51) Int. Cl.
F01L 1/34      (2006.01)

(52) U.S. Cl. .................. 123/90.16; 123/90.15

(58) Field of Classification Search .... 123/90.15–90.17, 123/90.31
See application file for complete search history.

(56) References Cited

U.S. PATENT DOCUMENTS

| | | | |
|---|---|---|---|
| 6,330,869 B1 | 12/2001 | Yoshiki et al. | |
| 6,502,537 B2 | 1/2003 | Todo et al. | |
| 6,550,437 B2 | 4/2003 | Nakamura et al. | |
| 6,705,257 B2 * | 3/2004 | Shimizu | 123/90.15 |
| 6,840,235 B2 | 1/2005 | Koseki et al. | |
| 7,159,545 B2 | 1/2007 | Miyakoshi et al. | |
| 7,159,548 B2 * | 1/2007 | Shindou | 123/90.16 |
| 7,168,402 B2 | 1/2007 | Takemura et al. | |
| 7,198,012 B2 | 4/2007 | Suga et al. | |
| 7,213,554 B2 | 5/2007 | Kanada et al. | |
| 7,246,581 B2 | 7/2007 | Suga et al. | |
| 7,246,594 B2 | 7/2007 | Hartmann | |
| 7,322,324 B2 | 1/2008 | Hara et al. | |
| 7,357,119 B2 | 4/2008 | Yoshida et al. | |
| 7,406,935 B2 | 8/2008 | Suga et al. | |
| 7,594,487 B2 | 9/2009 | Okamoto | |
| 7,793,625 B2 | 9/2010 | Nakamura et al. | |
| 7,827,949 B2 | 11/2010 | Suga et al. | |
| 2004/0154568 A1 | 8/2004 | Yamauchi et al. | |
| 2005/0211204 A1 * | 9/2005 | Todo et al. | 123/90.16 |
| 2007/0163524 A1 * | 7/2007 | Muraji et al. | 123/90.16 |
| 2009/0007866 A1 | 1/2009 | Nakamura | |
| 2009/0078223 A1 | 3/2009 | Nakamura | |

FOREIGN PATENT DOCUMENTS

| | | |
|---|---|---|
| CN | 1651724 A | 8/2005 |
| EP | 1 559 875 A2 | 8/2005 |
| JP | 6-235307 A | 8/1994 |
| JP | 10-008935 A | 1/1998 |
| JP | 10-082334 A | 3/1998 |

(Continued)

OTHER PUBLICATIONS

Makoto Nakamura, USPTO Office Action, U.S. Appl. No. 12/213,191, Jan. 12, 2011, 6 pages.

(Continued)

Primary Examiner — Zelalem Eshete
(74) Attorney, Agent, or Firm — Foley & Lardner LLP

(57) ABSTRACT

A variable valve actuating apparatus for an internal combustion engine includes an intake valve operating angle varying mechanism, an intake valve timing varying mechanism, and an exhaust valve timing varying mechanism. Before startup of the engine, the intake valve operating angle varying mechanism holds an intake valve operating angle at an intermediate value, the intake valve timing varying mechanism holds intake valve opening and closing timings most advanced, and the exhaust valve timing varying mechanism holds exhaust valve opening and closing timings most retarded.

23 Claims, 16 Drawing Sheets

FOREIGN PATENT DOCUMENTS

| | | |
|---|---|---|
| JP | 11-93714 A | 4/1999 |
| JP | 2002-227615 A | 8/2002 |
| JP | 2002-256832 A | 9/2002 |
| JP | 2003-35167 A | 2/2003 |
| JP | 2003-172112 A | 6/2003 |
| JP | 2004-076618 A | 3/2004 |
| JP | 2004-156508 A | 6/2004 |
| JP | 2004-257373 A | 9/2004 |
| JP | 2004-346887 A | 12/2004 |
| JP | 2005-105874 A | 4/2005 |
| JP | 2005-226511 A | 8/2005 |
| JP | 2005-233049 A | 9/2005 |
| JP | 2005-264804 A | 9/2005 |
| JP | 2006-70726 A | 3/2006 |
| JP | 2006-138292 A | 6/2006 |
| JP | 2006-200391 A | 8/2006 |

OTHER PUBLICATIONS

Makoto Nakamura, USPTO Notice of Allowance, U.S. Appl. No. 12/213,191, 6 pages.

Makoto Nakamura, USPTO Notice of Allowance, U.S. Appl. No. 12/131,460, 8 pages.

Makoto Nakamura, USPTO Office Action, U.S. Appl. No. 12/208,017, 12 pages.

* cited by examiner

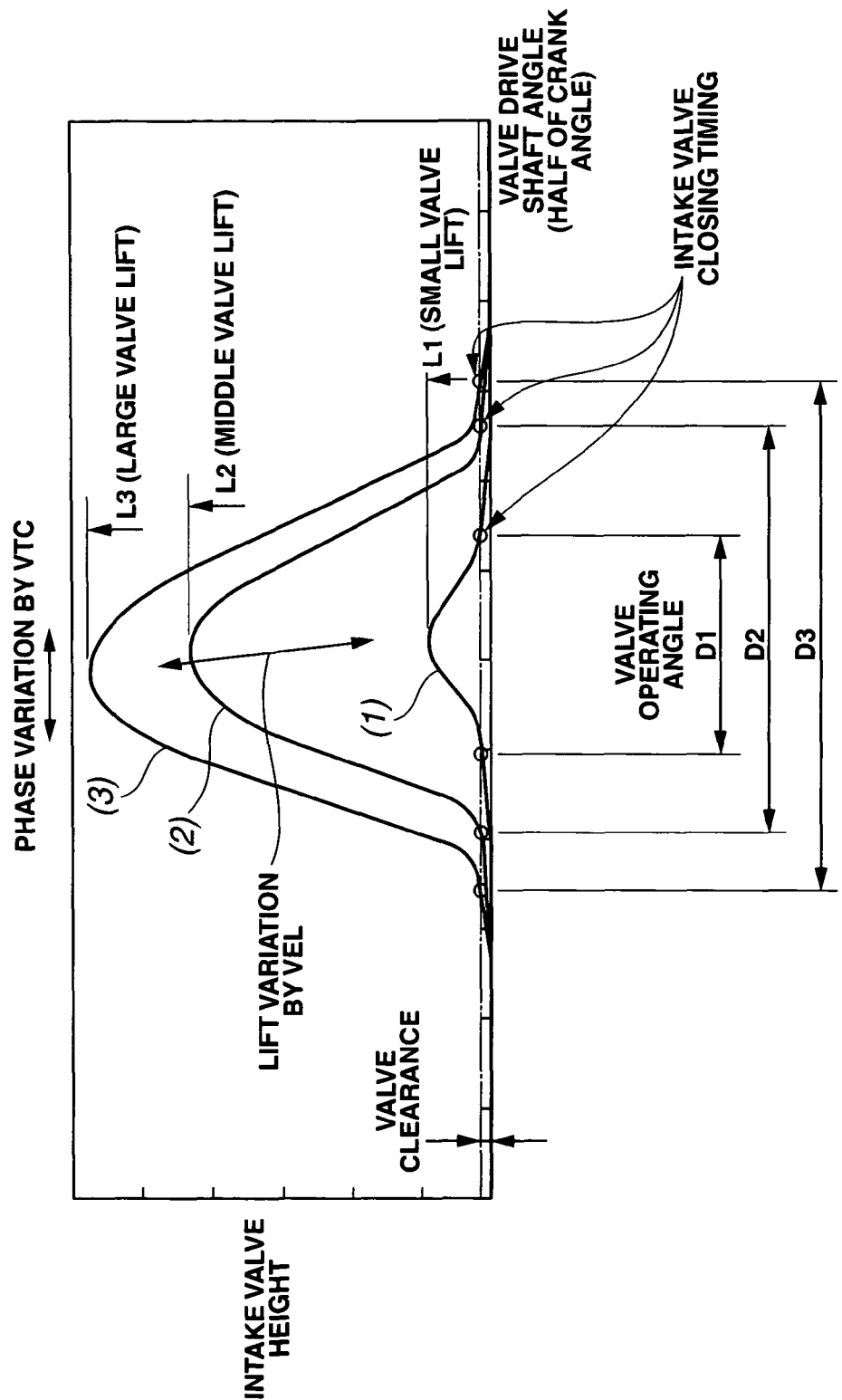

ROTATIONAL DIRECTION OF TIMING SPROCKET (DIRECTION OF ADVANCE)

ROTATIONAL DIRECTION OF TIMING SPROCKET (DIRECTION OF ADVANCE)

VARIABLE VALVE ACTUATING APPARATUS FOR INTERNAL COMBUSTION ENGINE

BACKGROUND OF THE INVENTION

The present invention relates to variable valve actuating apparatuses or systems for controlling opening and closing timings of intake valves and exhaust valves of internal combustion engines.

Japanese Patent Application Publication No. 6-235307 discloses a variable valve actuating system for an internal combustion engine. This variable valve actuating system includes an intake valve timing varying mechanism for varying opening and closing timings of intake valves of the engine, and an exhaust valve timing varying mechanism for varying opening and closing timings of exhaust valves of the engine. A control unit controls the opening and closing timings of the intake valves and exhaust valves in accordance with an operating state of the engine, by hydraulically actuating the intake and exhaust valve timing varying mechanisms.

SUMMARY OF THE INVENTION

The variable valve actuating system disclosed in Japanese Patent Application Publication No. 6-235307 may face difficulties during cold start. For example, during cold start, it may be difficult to quickly actuate both of the intake and exhaust valve timing varying mechanisms by rapidly raised hydraulic pressures in order to achieve desired opening and closing timings of intake valves and exhaust valves for cold start conditions, because of a low temperature of an operating fluid flowing in a hydraulic circuit for the intake and exhaust valve timing varying mechanisms, and accordingly, because of a high viscosity of the operating fluid.

It is desirable to provide a variable valve actuating apparatus or system for an internal combustion engine which is capable of improving the engine performance during cold start.

According to one aspect of the present invention, a variable valve actuating apparatus for an internal combustion engine comprises: an intake valve operating angle varying mechanism arranged to vary an intake valve operating angle of the internal combustion engine, and to hold an intake valve closing timing of the internal combustion engine at or near bottom dead center, before startup of the internal combustion engine; and an exhaust valve timing varying mechanism arranged to vary an exhaust valve opening timing and an exhaust valve closing timing of the internal combustion engine, while holding constant an exhaust valve operating angle of the internal combustion engine, and to hold the exhaust valve opening timing and the exhaust valve closing timing retarded by a predetermined amount from respective predetermined most advanced timings, before startup of the internal combustion engine. The intake valve operating angle varying mechanism may be arranged to hold the intake valve operating angle at a predetermined middle value between a predetermined maximum value and a predetermined minimum value so as to hold the intake valve closing timing at or near bottom dead center, before startup of the internal combustion engine. The intake valve operating angle varying mechanism may include at least two opposite biasing devices arranged to bias the intake valve operating angle in two opposite directions so as to hold the intake valve operating angle at the predetermined middle value. The intake valve operating angle varying mechanism may be arranged to hold the intake valve operating angle at a predetermined value closer to a predetermined minimum value than to a predetermined maximum value so as to hold the intake valve closing timing at or near bottom dead center, before startup of the internal combustion engine. The intake valve operating angle varying mechanism may include at least one biasing device arranged to bias the intake valve operating angle so as to hold the intake valve closing timing at or near bottom dead center, before startup of the internal combustion engine. The intake valve operating angle varying mechanism and the exhaust valve timing varying mechanism may be arranged to hold an intake valve opening timing of the internal combustion engine advanced from the exhaust valve closing timing so as to produce a valve overlap period, before startup of the internal combustion engine. The exhaust valve timing varying mechanism may be arranged to hold the exhaust valve opening timing and the exhaust valve closing timing at respective predetermined most retarded timings, before startup of the internal combustion engine. The variable valve actuating apparatus may be adapted to a direct fuel injection internal combustion engine in which a fuel is injected directly into a combustion chamber.

According to another aspect of the present invention, a variable valve actuating apparatus for an internal combustion engine comprises: an intake valve operating angle varying mechanism arranged to vary an intake valve operating angle of the internal combustion engine, and to hold the intake valve operating angle smaller by a predetermined amount than a predetermined maximum value, before startup of the internal combustion engine; and an exhaust valve timing varying mechanism arranged to vary an exhaust valve opening timing and an exhaust valve closing timing of the internal combustion engine, while holding constant an exhaust valve operating angle of the internal combustion engine, and to hold the exhaust valve opening timing and the exhaust valve closing timing retarded by a predetermined amount from respective predetermined most advanced timings, before startup of the internal combustion engine. The variable valve actuating apparatus may further comprise an intake valve timing varying mechanism arranged to vary an intake valve opening timing and an intake valve closing timing of the internal combustion engine, while holding constant the intake valve operating angle, and to hold the intake valve opening timing and the intake valve closing timing at respective predetermined relatively advanced timings, before startup of the internal combustion engine. The variable valve actuating apparatus may further comprise an intake valve timing varying mechanism arranged to vary an intake valve opening timing and an intake valve closing timing of the internal combustion engine, while holding constant the intake valve operating angle, and to hold the intake valve opening timing and the intake valve closing timing at respective predetermined relatively retarded timings, before startup of the internal combustion engine. The intake valve operating angle varying mechanism may be arranged to hold the intake valve operating angle at a predetermined minimum value, before startup of the internal combustion engine. The variable valve actuating apparatus may be adapted to a direct fuel injection internal combustion engine in which a fuel is injected directly into a combustion chamber. The variable valve actuating apparatus may further comprise a controller configured to perform at least one of first and second corrective actions, when determining that the internal combustion engine is in a state of unstable combustion, wherein the first corrective action is to advance the exhaust valve closing timing by the exhaust valve timing varying mechanism, and the second corrective action is to retard the intake valve opening timing by an intake valve timing varying mechanism. The variable valve actuating apparatus may further comprise a controller configured to perform at least one of first and second corrective actions, when determining that the internal combustion engine is warmed up and at idle, wherein the first corrective action is to advance the exhaust valve closing timing by the exhaust valve timing varying mechanism, and the second corrective action is to retard the intake valve opening timing by an intake valve timing varying mechanism.

According to a further aspect of the present invention, a variable valve actuating apparatus for an internal combustion engine comprises: an intake valve timing varying mechanism arranged to vary an intake valve opening timing and an intake valve closing timing of the internal combustion engine, while holding constant an intake valve operating angle of the internal combustion engine, and to hold the intake valve opening timing and the intake valve closing timing at respective predetermined most retarded timings, before startup of the internal combustion engine; and an exhaust valve timing varying mechanism arranged to vary an exhaust valve opening timing and an exhaust valve closing timing of the internal combustion engine, while holding constant an exhaust valve operating angle of the internal combustion engine, and to hold the exhaust valve opening timing and the exhaust valve closing timing retarded by a predetermined amount from respective predetermined most advanced timings, before startup of the internal combustion engine. The variable valve actuating apparatus may be adapted to a direct fuel injection internal combustion engine in which a fuel is injected directly into a combustion chamber.

BRIEF DESCRIPTION OF THE DRAWINGS

FIG. 4 is a graphic diagram showing how the lift, operating angle, and maximum lift phase of an intake valve of the engine are controlled by the variable valve actuating system of FIG. 1.

DETAILED DESCRIPTION OF THE INVENTION

Figure 1:
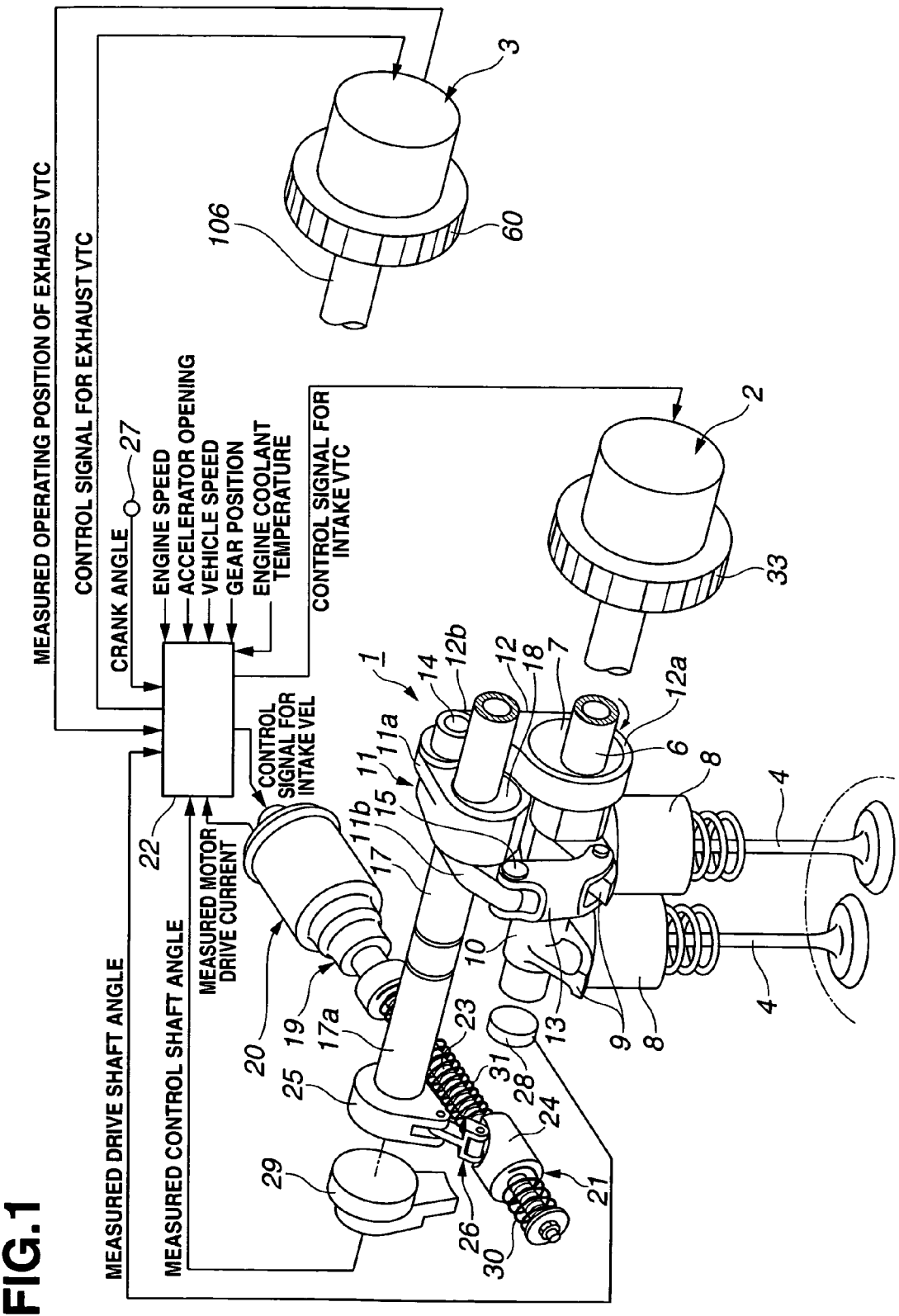
FIG. 1 is a schematic diagram showing an internal combustion engine system including a variable valve actuating system or apparatus according to a first embodiment of the present invention, showing a perspective view of an intake valve operating angle varying mechanism, an intake valve timing varying mechanism, and an exhaust valve timing varying mechanism in the variable valve actuating system.

FIG. 1 schematically shows an internal combustion engine system including a variable valve actuating system or apparatus according to a first embodiment of the present invention. In this embodiment, the internal combustion engine system includes a four-cycle internal combustion engine. As shown in FIG. 1, the variable valve actuating system includes an intake valve operating angle varying mechanism (intake valve lift varying mechanism, intake valve event and lift varying mechanism, or intake VEL) 1 for continuously varying (increasing or reducing) the lift and operating angle (operating period, or period when a valve is open) of intake valves 4, an intake valve timing varying mechanism (intake valve phase varying mechanism, intake valve timing control mechanism, or intake VTC) 2 for continuously varying (advancing or retarding) a phase (maximum lift phase) of intake valves 4 so as to vary (advance or retard) the opening and closing timings of intake valves 4 (an intake valve opening timing IVO and an intake valve closing timing IVC), while holding constant the operating angle of intake valves 4, and an exhaust valve timing varying mechanism (exhaust valve phase varying mechanism, exhaust valve timing control mechanism, or exhaust VTC) 3 for continuously varying (advancing or retarding) a phase (maximum lift phase) of exhaust valves not shown so as to vary (advance or retard) the opening and closing timings of the exhaust valves (an exhaust valve opening timing EVO and an exhaust valve closing timing EVC), while holding constant the operating angle of the exhaust valves.

Figure 2A:
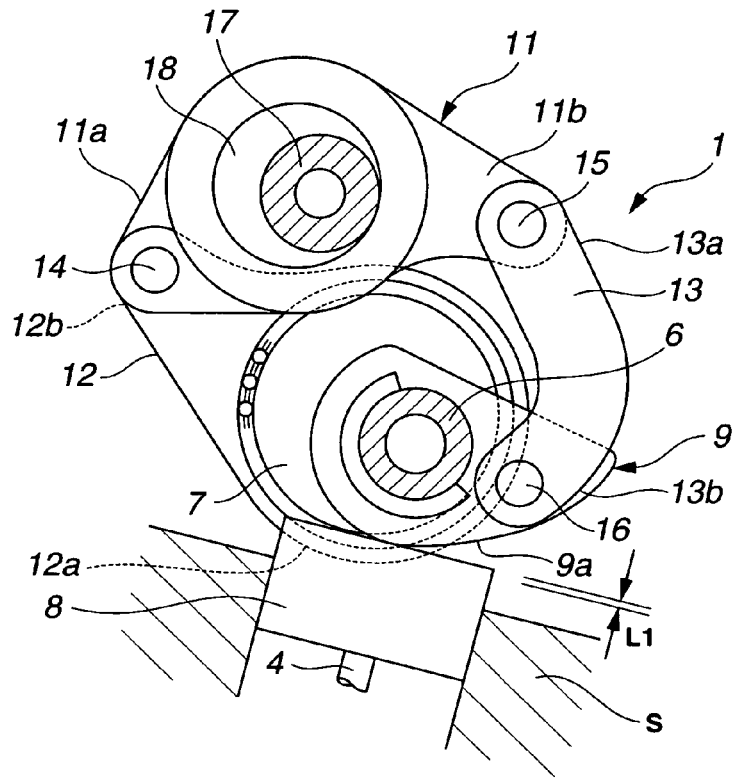
FIGS. 2A and 2B are diagrams illustrating how the intake valve operating angle varying mechanism of FIG. 1 operates when controlled to be in a state of small valve lift.

The intake VEL 1 has a construction substantially identical to the construction disclosed in Japanese Patent Application Publication No. 2003-172112. As shown in FIGS. 1 and 2A, the intake VEL 1 includes a hollow drive shaft 6 which is rotatably supported by bearings on an upper part of a cylinder head "S"; a drive cam 7 which is an eccentric rotary cam fixedly mounted on drive shaft 6 by press fitting in this example; a pair of swing cams 9 which are swingably mounted on drive shaft 6, and arranged to open the intake valves 4, respectively, by sliding on top surfaces of valve lifters 8 provided in the upper ends of intake valves 4; and a linkage or motion transmitting mechanism arranged to transmit rotation of drive cam 7 to swing cams 9 for swing motion.

Drive shaft 6 is arranged to receive rotation from a crankshaft through a rotation transmitting mechanism which, in this example, is a chain drive including a timing sprocket 33 provided on one end of drive shaft 6, a driving sprocket provided on the crankshaft, and a timing chain not shown. When driven by the crankshaft, the drive shaft 6 rotates in the clockwise direction as shown by an arrow in FIG. 1.

Drive cam 7 is shaped like a ring, and formed with a drive shaft receiving hole. Drive cam 7 is fixedly mounted on drive shaft 6 extending through the drive shaft receiving hole. The axis of drive cam 7 is offset in the radial direction from the axis of drive shaft 6 by a predetermined distance.

As shown in FIGS. 1 and 2A, swing cams 9 are formed integrally at both ends of an annular camshaft 10. Camshaft 10 is hollow and rotatably mounted on drive shaft 6. Each swing cam 9 has a lower surface including a cam surface 9a. Cam surface 9a includes a base circle surface region on the cam shaft's side, a ramp surface region extending like a circular arc from the base circle surface region toward a cam nose, and a lift surface region extending from the ramp surface region toward an apex of the cam nose. The cam surface 9a abuts on the top surface of the corresponding valve lifter 8 at a predetermined position, and the contact point of the cam surface 9a shifts among the base circle surface region, ramp surface region and lift surface region in dependence on the swing position of the swing cam 9.

The above-mentioned linkage or motion transmitting mechanism includes a rocker arm 11 disposed above drive shaft 6; a link arm 12 connecting a first end portion 11a of rocker arm 11 with drive cam 7; and a link rod 13 connecting a second end portion 11b of rocker arm 11 with one swing cam 9.

Rocker arm 11 includes a tubular central base portion formed with a support hole, and rotatably mounted on a control cam 18 through the support hole. The first end portion 11a of rocker arm 11 is connected rotatably with link arm 12 by a pin 14, and the second end portion 11b is connected rotatably with a first end portion 13a of link rod 13 by a pin 15.

Link arm 12 includes a relatively large annular base portion 12a and a projection 12b projecting outward from the base portion 12a. Base portion 12a is formed with a center hole in which the cam portion of the drive cam 7 is rotatably fit. The projection 12b is connected rotatably with the first end portion 11a of rocker arm 11 by pin 14.

Link rod 13 includes a second end 13b which is connected rotatably with the cam nose of swing cam 9 by a pin 16.

Control shaft 17 extends in parallel to drive shaft 6 in the longitudinal direction of the engine, and is rotatably supported by the same bearings at a position just above drive shaft 6. Control cam 18 is fixedly mounted on control shaft 17 and fit slidably in the support hole of rocker arm 11 to serve as a fulcrum for the swing motion of rocker arm 11. Control cam 18 is shaped like a hollow cylinder, and the axis of control cam 18 is offset from the axis of the control shaft 17 by a predetermined distance. Rotation of control shaft 17 is controlled by a drive mechanism 19.

Drive mechanism 19 includes an electric motor 20 which is fixed to one end of a housing; and a transmission mechanism 21 to transmit rotation of the electric motor 20 to the control shaft 17. In this example, the transmission mechanism 21 is a ball screw transmission mechanism.

Electric motor 20 of this example is a proportional type DC motor. Electric motor 20 is controlled by a controller 22 in accordance with a measured operating state of the engine.

Ball screw transmission mechanism 21 includes a ball screw shaft 23, a ball nut 24, a connection arm 25 and a link member 26. Ball screw shaft 23 and the drive shaft of electric motor 20 are arranged end to end and aligned with each other so that their axes form a substantially straight line. Ball nut 24 serves as a movable nut screwed on the ball screw shaft 23 and arranged to move axially in accordance with the rotation. Connection arm 25 is connected with one end portion of control shaft 17. Link member 26 links the connection arm 25 and ball nut 24.

Ball screw shaft 23 is formed with an external single continuous ball circulating groove extending, in the form of a helical thread, over the outside surface of ball screw shaft 23. Ball screw shaft 23 and the drive shaft of electric motor 20 are connected end to end by a coupling member which transmits a rotational driving force from electric motor 20 to ball screw shaft 23. Ball nut 24 is approximately in the form of a hollow cylinder. Ball nut 24 is formed with an internal guide groove designed to hold a plurality of balls in cooperation with the ball circulating groove of ball screw shaft 23 so that the balls can roll between the guide groove and the circulating groove. This guide groove is a single continuous helical thread formed in the inside circumferential surface of ball nut 24. Ball nut 24 is arranged to translate the rotation of ball screw shaft 23 into a linear motion of ball nut 24 and produce an axial force.

A first coil spring 30 as a biasing device is disposed around ball screw shaft 23 between ball nut 24 and a spring seat provided at the tip of ball screw shaft 23, so as to urge the ball nut 24 axially toward electric motor 20. It is to be understood from the following description that first coil spring 30 serves to bias the ball nut 24 in the direction to reduce the lift and operating angle of intake valves 4. Moreover, a second coil spring 31 as a biasing device is disposed around ball screw shaft 23 between ball nut 24 and a spring seat provided at a portion of ball screw shaft 23 close to electric motor 20, so as to urge the ball nut 24 axially away from electric motor 20. It is to be understood from the following description that second coil spring 31 serves to bias the ball nut 24 in the direction to increase the lift and operating angle of intake valves 4. Accordingly, when the engine is at rest, ball nut 24 is held, by first and second coil springs 30, 31, in an intermediate (substantially middle) position along the axis of ball screw shaft 23. It is to be understood from the following description that first and second coil springs 30, 31 serve to stably hold the ball nut 24 in the intermediate position so as to provide an intermediate lift and intermediate operating angle of intake valves 4. Ball nut 24 is thus mechanically stable in the intermediate position.

Controller 22 of this example is a common control unit or control section used for controlling all of the intake VEL 1, the intake VTC 2, and the exhaust VTC 3. Controller 22 is connected with various sensors to collect information on an operating state of the engine. Controller 22 receives data signals outputted from the sensors, and identifies the engine operating state on the basis of the data signals. The sensors include a crank angle sensor for sensing the rotation angle of the crankshaft and sensing an engine speed N (rpm), an accelerator opening sensor, a vehicle speed sensor, a gear position sensor, an engine coolant temperature sensor for sensing the temperature of an engine body, a drive shaft angle sensor 28 for sensing the rotation angle of drive shaft 6, and a potentiometer (control shaft angle sensor) 29 for sensing the rotation angle of control shaft 17. Controller 22 measures the relative rotational position between timing sprocket 33 and drive shaft 6 on the basis of the data signals from crank angle sensor 27 and drive shaft angle sensor 28.

Figure 2B:
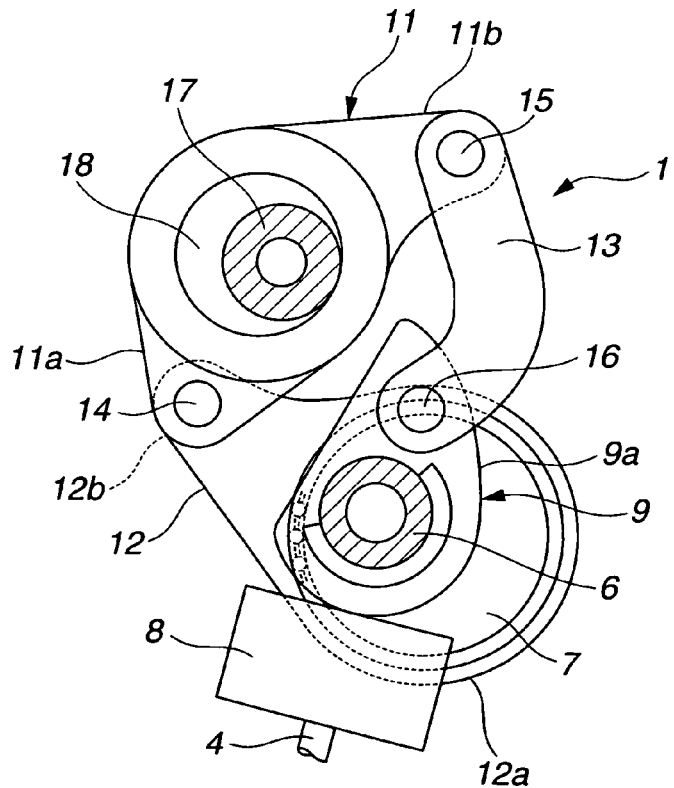

The thus-constructed intake VEL 1 is controlled to operate as follows. When the engine is operating in a predetermined engine operating region, the controller 22 acts to move the ball nut 24 rectilinearly toward electric motor 20, by sending a control current to electric motor 20 and rotating the ball screw shaft 23 with electric motor 20. With this movement of ball nut 24, the control shaft 17 is rotated in one direction by the link member 26 and connection arm 25. Accordingly, control cam 18 rotates about the axis of control shaft 17 so that the axis of control cam 18 rotates about the axis of control shaft 17, as shown in FIGS. 2A and 2B (in the form of rear view), and a thick wall portion of control cam 18 is shifted upwards from drive shaft 6. As a result, the pivot point between the second end portion 11b of rocker arm 11 and link rod 13 is shifted upwards relative to the drive shaft 6. Therefore, each swing cam 9 is rotated in the counterclockwise direction as viewed in FIGS. 2A and 2B, and the cam nose is pulled upwards by link rod 13. Accordingly, drive cam 7 rotates and pushes up the first end portion 11a of rocker arm 11 through link arm 12. Though a movement for valve lift is transmitted through link rod 13 to swing cam 9 and valve lifter 8, the valve lift is decreased sufficiently to a small lift L1 shown by a valve lift curve in FIG. 4, and the operating angle (valve opening period) D is decreased to a small value D1.

There is a valve clearance between swing cam 9 and valve lifter 8. Therefore, the actual valve lift is smaller by the valve clearance than the lift of swing cam 9. Accordingly, the valve operating angle is defined as extending from the timing when the valve is actually opened to the timing when the valve is actually closed.

When the engine is operating in another predetermined engine operating region, the controller 22 drives electric motor 20 in a reverse rotational direction, and thereby rotates the ball screw shaft 23 in the reverse direction. With this reverse rotation of ball screw shaft 23, the ball nut 24 moves in the axial direction away from electric motor 20, and control shaft 17 is rotated in the counterclockwise direction as viewed in FIGS. 2A and 2B by a predetermined amount. Therefore, the control cam 18 is held at the angular position at which the axis of control cam 18 is shifted downward by a predetermined amount from the axis of control shaft 17, and the thick wall portion of control cam 18 is shifted downwards. Rocker arm 11 is moved in the clockwise direction from the position of FIGS. 2A and 2B, and the end of rocker arm 11 pushes down the cam nose of swing cam 9 through link member 13, and swing cam 9 rotates in the clockwise direction slightly. Accordingly, drive cam 7 rotates and pushes up the end 11a of rocker arm 11 through link arm 12. A movement for valve lift is transmitted through link member 13 to swing cams 9 and valve lifters 8. In this case, the valve lift is increased to a medium lift L2, and the operating angle is increased to a medium angle D2. By this control operation, the variable valve actuating system can shift the intake valve closing timing on the retard side toward bottom dead center. By so doing, the variable valve actuating system can improve the combustion in a cold start operation with a higher effective compression ratio, and increase the fresh air charging efficiency to increase the combustion torque.

Figure 3A:
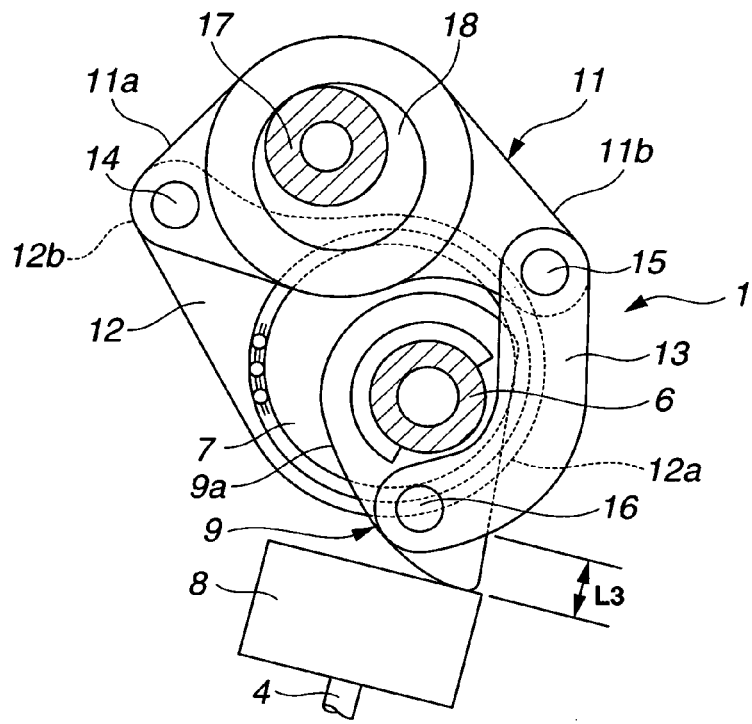
FIGS. 3A and 3B are diagrams illustrating how the intake valve operating angle varying mechanism of FIG. 1 operates when controlled to be in a state of maximum valve lift.
Figure 3B:
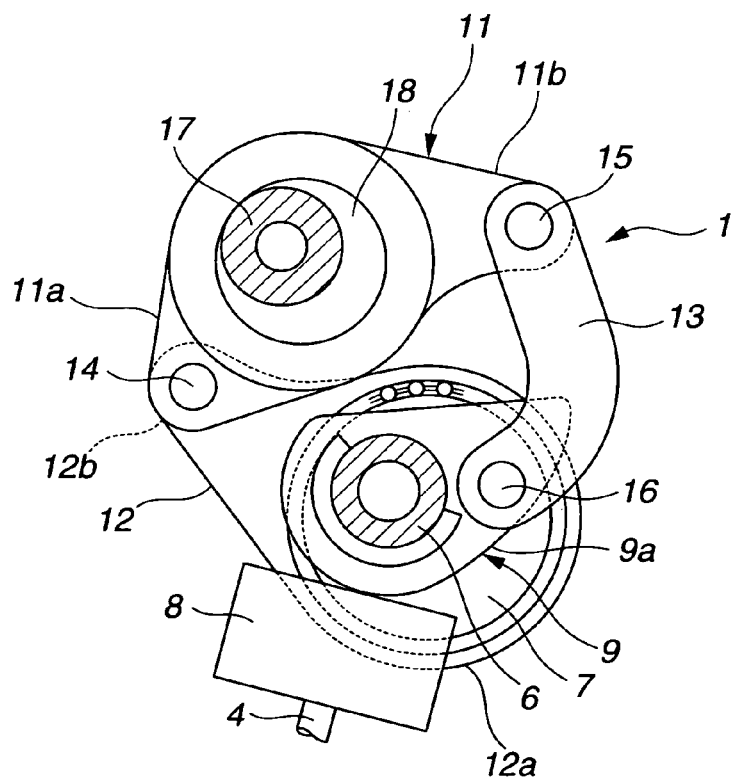

When the engine operating point enters a high speed and high load region, this variable valve actuating system can rotate electric motor 20 in the reverse direction by sending the control signal from controller 22, to rotate control cam 18 further in the counterclockwise direction with control shaft 17 to the position at which the axis is rotated downwards as shown in FIGS. 3A and 3B. Therefore, rocker arm 11 moves to a position closer to the drive shaft 6, and the second end 11b pushes down the cam nose of swing cam 9 through link rod 13, so that the swing cam 9 is further rotated in the clockwise direction by a predetermined amount. Accordingly, drive cam 7 rotates and pushes up the first end 11a of rocker arm 11 through link arm 12. A movement for valve lift is transmitted through link rod 13 to swing cam 9 and valve lifter 8. In this case, the valve lift is increased continuously from L2 to L3 as shown in FIG. 4. In this way, this system can improve the intake charging efficiency and the engine output in the high speed region.

In this way, the intake VEL 1 varies the lift of intake valves 4 continuously from the small lift L1 to the large lift L3, and also, the operating angle of intake valves 4 continuously from the small angle (angular distance) D1 to the large angle D3.

When the engine is at rest, the ball nut 24 is held in the middle position by the opposed forces of first and second coil springs 30, 31, so as to set the valve operating angle and lift at the medium angle D2 and medium lift L2, respectively. Accordingly, the intake valve closing timing IVC is set at or near bottom dead center.

Figure 5:
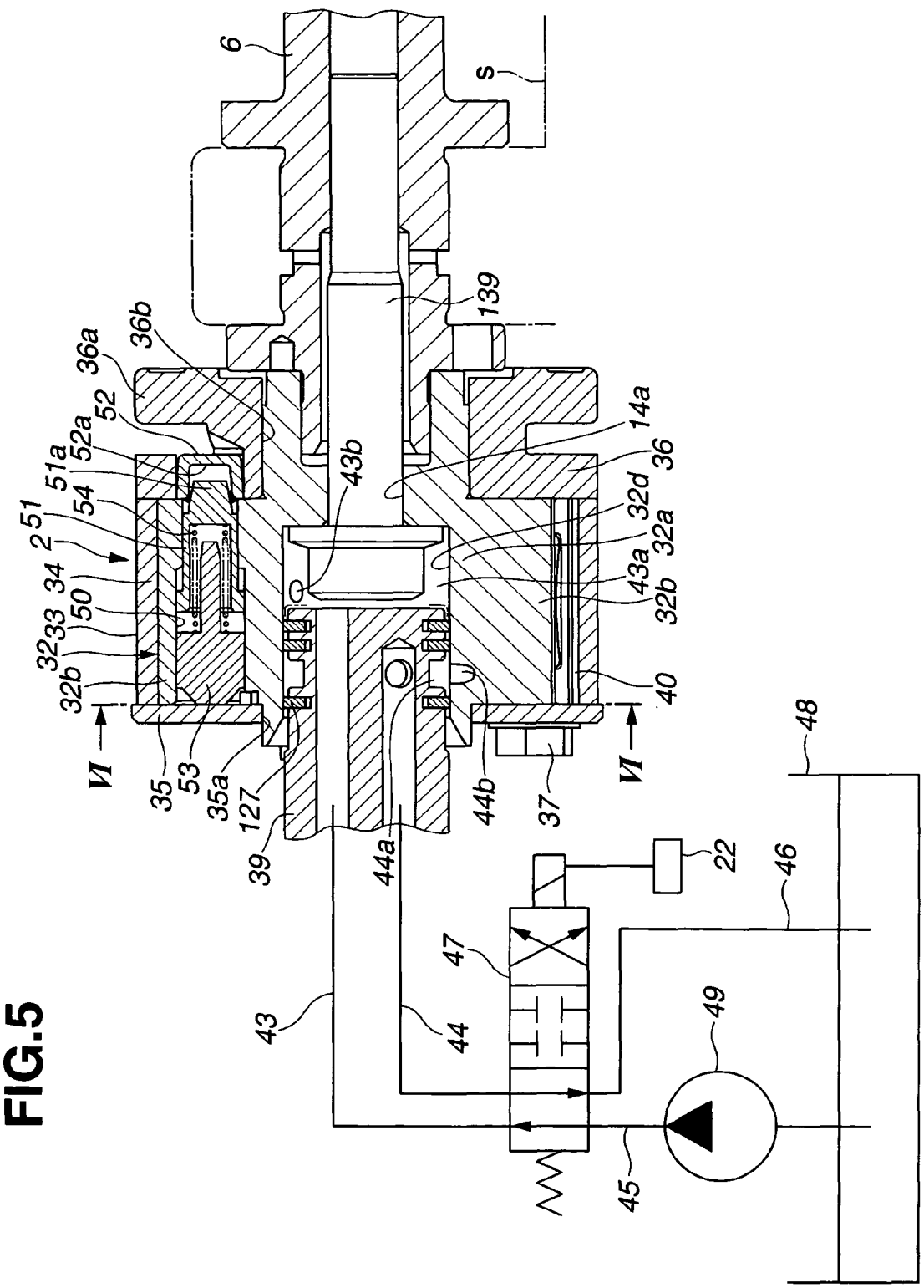
FIG. 5 is a sectional view of the intake valve timing varying mechanism in the variable valve actuating system of FIG. 1.
Figure 6:
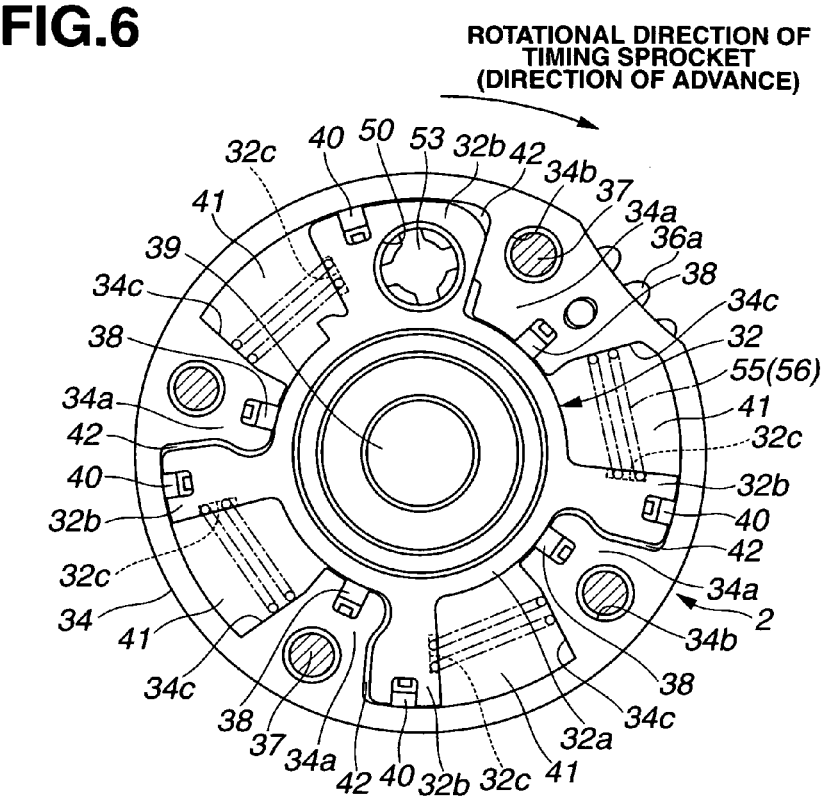
FIG. 6 is a sectional view, taken along a line VI-VI shown in FIG. 5, of the intake valve timing varying mechanism under a condition that the intake valve timing varying mechanism is controlled to be in a most advanced state.

As shown in FIGS. 5 and 6, the intake VTC 2 of this example is a vane type mechanism including the timing sprocket 33 for transmitting rotation to drive shaft 6; a vane member 32 which is fixed to one end of drive shaft 6 and received rotatably in the timing sprocket 33; and a hydraulic circuit to rotate the vane member 32 in the forward and reverse directions by the use of an oil pressure.

Timing sprocket 33 includes a housing 34 receiving the vane member 32 rotatably; a front cover 35 shaped like a circular disk and arranged to close a front opening of housing 34; and a rear cover 36 shaped approximately like a circular disk and arranged to close a rear opening of housing 34. Housing 34 is sandwiched between front and rear covers 35 and 36, and joined with these covers to form a unit, by four small diameter bolts 37 extending in the axial direction of drive shaft 6.

Housing 34 is in the form of a hollow cylinder having the front and rear openings. Housing 34 includes a plurality of shoes 34a projecting radially inwards from the inside circumferential surface and serving as a partition. In this example, four of the shoes 34a are arranged at intervals of about 90 degrees.

Each shoe 34a has an approximately trapezoidal cross section. A bolt hole 34b is formed approximately at the center of each shoe 34a. Each bolt hole 34b passes axially through one of shoes 34a, and receives the shank of one of the axially extending bolts 37. Each shoe 34a includes an inner end surface. A retaining groove extends axially in the form of cutout in the inner end surface of each shoe 34a at a higher position. A U-shaped seal member 38 is fit in each retaining groove, and urged radially inwards by a leaf spring not shown fit in the retaining groove.

Front cover 35 includes a center support hole 35a having a relatively large inside diameter; and four bolt holes not shown each receiving one of the axially extending bolts 37. These four bolt holes are arranged around the center support hole 35a, facing respective ones of the bolt holes 34b of shoes 34a.

Rear cover 36 includes a toothed portion 36a formed integrally on the rear side, and arranged to engage with the before-mentioned timing chain; and a center bearing hole 36b having a relatively large inside diameter and extending axially through rear cover 36.

Vane member 32 includes a central vane rotor 32a and a plurality of vanes 32b projecting radially outwards from the vane rotor 32a. In this example, four of the vanes 32b are arranged at angular intervals of approximately 90 degrees circumferentially around vane rotor 32a. Vane rotor 32a is annular and includes a center bolt hole 14a at the center. Vanes 32b are integral with vane rotor 32a. Vane member 32 is fixed to the front end of drive shaft 6 by a fixing bolt 139 extending axially through the center bolt hole 14a of vane rotor 32a.

The vane rotor 32a includes a front side small diameter tubular portion supported rotatably by the center support hole 35a of front cover 35, and a rear side small diameter tubular portion supported rotatably by the bearing hole 36b of rear cover 36.

Figure 7:
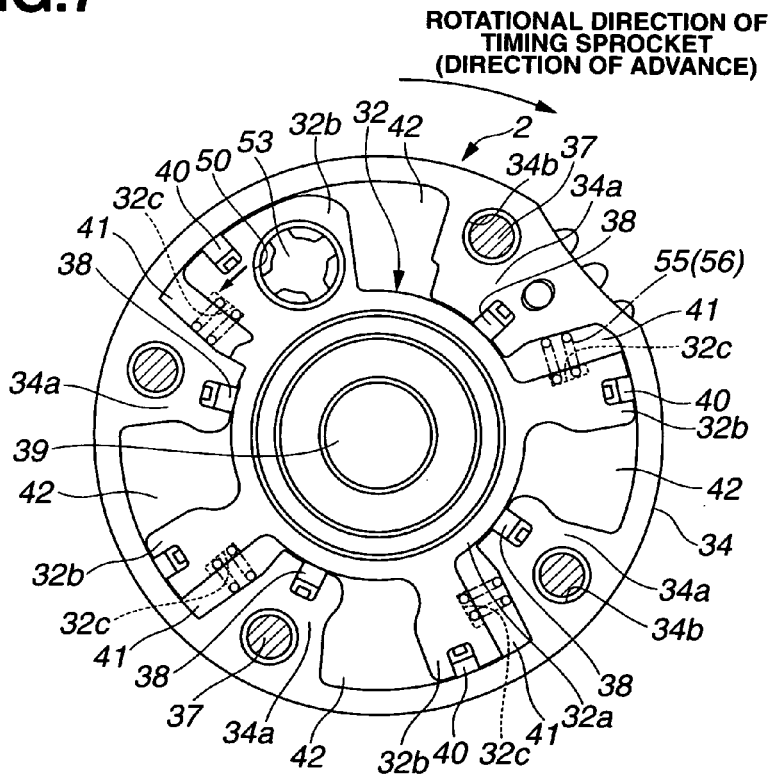
FIG. 7 is a sectional view, taken along the line VI-VI shown in FIG. 5, of the intake valve timing varying mechanism under a condition that the intake valve timing varying mechanism is controlled to be in a most retarded state.

Three of the four vanes 32b are smaller vanes shaped approximately like a relatively long rectangle, and the remaining one is a larger vane shaped like a relatively large trapezoid. The smaller vanes 32b are approximately equal in circumferential width whereas the larger vane 32b has a larger circumferential width greater than that of each of the smaller vanes 32b so that a weight balance is attained as a whole of vane member 32. The four vanes 32b of vane member 32 and the four shoes 34a of housing 34 are arranged alternately in the circumferential direction around the center axis, as shown in FIGS. 6 and 7. Each vane 32b includes an axially extending retaining groove receiving a U-shaped seal member 40 in sliding contact with the inside cylindrical surface of housing 34, and a leaf spring not shown for urging the seal member 40 radially outwards and thereby pressing the seal member 40 to the inside cylindrical surface of housing 34. Moreover, in one side of each vane 32b facing in the direction opposite to the rotational direction of drive shaft 6, there are formed two circular recesses 32c.

An advance fluid pressure chamber 41 and a retard fluid pressure chamber 42 are formed on both sides of each vane 32b. Accordingly, there are four of the advance fluid pressure chambers 41 and four of the retard fluid pressure chambers 42.

The hydraulic circuit includes a first fluid passage 43 leading to the advance fluid pressure chambers 41 to supply and drain an advance fluid pressure of an operating oil to and from advance fluid pressure chambers 41; a second fluid passage 44 leading to the retard fluid pressure chambers 42 to supply and drain a retard fluid pressure of the operating oil to and from retard fluid pressure chambers 42; and a directional control valve or selector valve 47 connecting the first fluid passage 43 and second fluid passage 44 selectively with a supply passage 45 and a drain passage 46. A fluid pump 49 is connected with supply passage 45, and arranged to draw the hydraulic operating fluid or oil from an oil pan 48 of the engine, and to force the fluid into supply passage 45. Pump 49 is a one-way type pump. The downstream end of drain passage 46 is connected to oil pan 48, and arranged to drain the fluid to oil pan 48.

First and second fluid passages 43 and 44 include sections formed in a cylindrical portion 39 which is inserted, from a first end, through the small diameter tubular portion of vane rotor 32a, into the support hole 32d of vane rotor 32a. A second end of the cylindrical portion 39 is connected with directional control valve 47.

Between the outside circumferential surface of the cylindrical portion 39 and the inside circumferential surface of support hole 32d, there are provided three annular seal members 127 fixedly mounted on the cylindrical portion 39 near the forward end and arranged to seal the first and second fluid passages 43 and 44 off from each other.

First fluid passage 43 includes a passage section 43a serving as a pressure chamber, and four branch passages 43b connecting the passage section 43a, respectively, with the four advance fluid pressure chambers 41. Passage section 43a is formed in an end portion of support hole 32d on the side of drive shaft 6. The four branch passages 43b are formed in vane rotor 32a and extend radially in vane rotor 32a.

Second fluid passage 44 includes an axially extending passage section extending axially in the cylindrical portion 39 to a closed end; an annular chamber 44a formed around the axially extending passage section near the closed end; and an L-shaped passage section 44b connecting the annular chamber 44a with each retard pressure chamber 42.

Directional control valve 47 of this example is a solenoid valve having four ports and three positions. A valve element inside the directional control valve 47 is arranged to alter the connection between first and second fluid passages 43 and 44 and the supply and drain passages 45 and 46 under the control of the controller 22. When directional control valve 47 is controlled to be in its neutral position, then no operating fluid is supplied to both of advance fluid pressure chamber 41 and retard fluid pressure chamber 42, and accordingly, vane member 32 is fixed.

The intake VTC 2 includes a lock mechanism disposed between vane member 32 and housing 34 for locking or allowing the rotation of vane member 32 with respect to housing 34. Specifically, this lock mechanism is disposed between rear cover 36 and the larger vane 32b. The lock mechanism includes a slide hole 50, a lock pin 51, a lock recess 52a, a spring retainer 53, and a coil spring 54. Slide hole 50 is formed in the larger vane 32b, extending in the axial direction of drive shaft 6. Lock pin 51 is cup-shaped, disposed in slide hole 50, and slidably supported on slide hole 50. Lock recess 52a is formed in a portion 52 fixed to a hole defined in rear cover 36, and arranged to receive a tip portion 51a of lock pin 51. The tip portion 51a is tapered. Spring retainer 53 is fixed to a bottom portion of slide hole 50. Coil spring 54 is retained by spring retainer 53, and arranged to bias the lock pin 51 toward the lock recess 52a.

The lock recess 52a is hydraulically connected to advance fluid pressure chamber 41 or pump 49 through a fluid passage not shown, and receives the hydraulic pressure in advance fluid pressure chamber 41 or the discharge pressure of the pump.

When vane member 32 is in its most advanced position with respect to housing 34, the lock pin 51 is biased by coil spring 54 toward lock recess 52a so that the tip portion 51a of lock pin 51 is fit in lock recess 52a. The relative rotation between timing sprocket 33 and drive shaft 6 is thus locked. When lock recess 52a receives the hydraulic pressure in advance fluid pressure chamber 41 or the discharge pressure of the oil pump, then lock pin 51 moves away from lock recess 52a, so as to release drive shaft 6 with respect to timing sprocket 33.

Between one side surface of each vane 32b and a confronting side surface 34c of an adjacent one of the shoes 34a, there are disposed a pair of coil springs 55 and 56 serving as biasing means for urging the vane member 32 in the advance rotational direction. In other words, coil springs 55 and 56 serve as a biasing device arranged to bias the intake VTC 2 in a direction to advance the opening timing and the closing timing of intake valves 4.

Though the two coil springs 55 and 56 are overlapped in FIGS. 6 and 7, the two coil springs 55 and 56 extend separately in parallel to each other. The two coil springs 55 and 56 have an equal axial length (coil length) which is longer than the spacing between the one side surface of the corresponding vane 32b and the confronting side surface 34c of the adjacent shoe 34a. The two coil springs 55 and 56 are spaced with such an interaxis distance that the springs 55 and 56 do not contact each other even when the springs 55 and 56 are compressed to the maximum extent. The two coil springs 55 and 56 are connected through a retainer shaped like a thin sheet and fit in the recesses 32c of the corresponding shoe 34a.

The thus-constructed intake VTC 2 is controlled to operate as follows. At the time of stop of the engine, the controller 22 stops the output of the control current to directional control valve 47, so that the valve element of directional control valve 47 is placed in a default position as shown in FIG. 5 so as to allow fluid communication between supply passage 45 and first fluid passage 43. At the time of stop of the engine, the supplied fluid pressure is equal to zero, because oil pump 49 is also inoperative. Accordingly, vane member 32 is biased by coil springs 55, 56, so as to rotate in the clockwise direction about the axial direction of drive shaft 6 as viewed in FIG. 6. As a result, vane member 32 is brought into a position such that the larger vane 32b is in contact with the confronting side surface of shoe 34a. Drive shaft 6 is thus in the most advanced position with respect to timing sprocket 33. Simultaneously, the tip portion 51a of lock pin 51 is inserted into lock recess 52a, so as to prevent drive shaft 6 from rotating with respect to timing sprocket 33. The intake VTC 2 is thus mechanically and stably held in its default position for most advanced intake valve opening timing IVO and intake valve closing timing IVC.

When the engine is started by turning on the ignition switch and cranking the crankshaft with a starter motor, then directional control valve 47 starts to receive a control signal from controller 22. However, immediately after the engine start, vane member 32 is still held in the most advanced position by means of the lock mechanism and coil springs 55, 56, because the discharge pressure of oil pump 49 is not yet sufficiently high. At this moment, directional control valve 47 allows fluid communication between supply passage 45 and first fluid passage 43, and between drain passage 46 and second fluid passage 44. Then, the oil pressure from oil pump 49 is raised and supplied through first fluid passage 43 to advance fluid pressure chambers 41, while the retard fluid pressure chambers 42 are held in a low pressure state in which no oil pressure is supplied, and the oil pressure is drained through drain passage 46 into oil pan 48.

After the discharge pressure of oil pump 49 is increased sufficiently, the controller 22 can control the position of vane member 32 by means of directional control valve 47. For example, when the engine is at idle after warmed up, the directional control valve 47 is controlled to allow fluid communication between supply passage 45 and second fluid passage 44 and between drain passage 46 and first fluid passage 43. Accordingly, the oil pressure discharged by pump 49 is supplied through second fluid passage 44 to retard fluid pressure chamber 42, while the oil pressure is drained from advance fluid pressure chamber 41 through first fluid passage 43 and drain passage 46 to oil pan 48 so that advance fluid pressure chamber 41 remains in a low-pressure state. The oil pressure is supplied to lock recess 52a as well as retard fluid pressure chamber 42, so that lock pin 51 moves back against the biasing force of coil spring 54, and the tip portion 51a is moves out of lock recess 52a. Accordingly, vane member 32 is unlocked with respect to housing 34, and is rotated in the counterclockwise direction by the increased pressures in retard fluid pressure chambers 42, against the spring forces of coil springs 55 and 56, as viewed in FIG. 6. Consequently, drive shaft 6 rotates to the retard side, relative to timing sprocket 33, retarding the intake valve opening timing IVO and intake valve closing timing IVC.

When the engine enters a predetermined low speed and middle load region thereafter, then the controller 22 operates the directional control valve 47 to the position connecting the supply passage 45 with first fluid passage 43 and connecting the drain passage 46 with second fluid passage 44. Therefore, the oil pressure in retard fluid pressure chambers 42 is decreased by return through second fluid passage 44 and drain passage 46 to oil pan 48, whereas the oil pressure in advance fluid pressure chambers 41 is increased by supply of the oil pressure. Vane member 32 rotates in the clockwise direction by the high pressure in advance fluid pressure chambers 41 and the spring forces of coil springs 55 and 56, and thereby shifts the relative rotational phase of drive shaft 6 relative to timing sprocket 33 to the advance side.

When the engine enters a predetermined middle and high speed region from the low speed region, the oil pressure in advance fluid pressure chambers 41 decreases, the oil pressure in retard fluid pressure chambers 42 increases, and hence the vane member 32 shifts the relative rotational phase of drive shaft 6 relative to timing sprocket 33 to the retard side, against the spring forces of coil springs 55 and 56, as shown in FIG. 7. Then, directional control valve 47 is controlled to be in its neutral position, so that the vane member 32 is fixed relative to housing 34.

Figure 8:
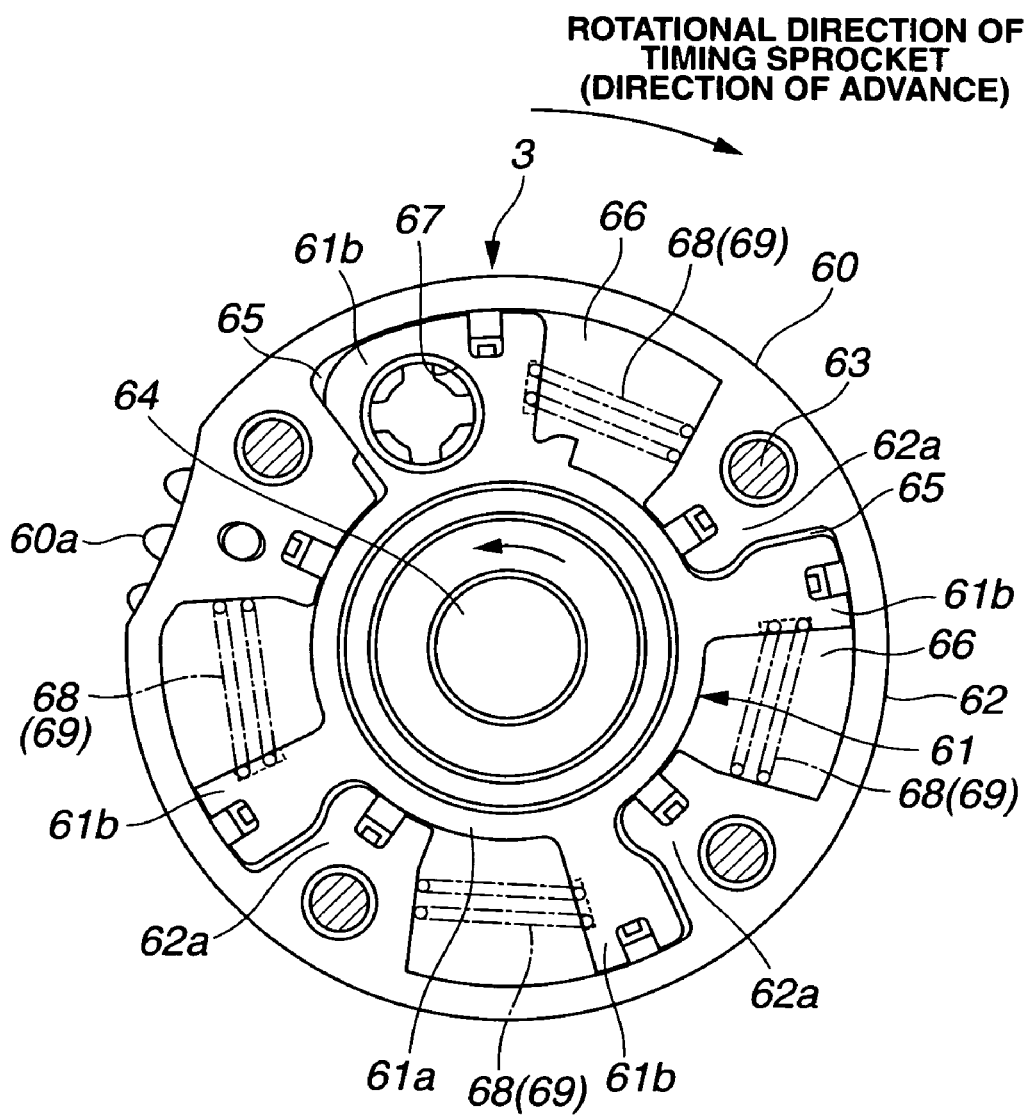
FIG. 8 is a front view of the exhaust valve timing varying mechanism in the variable valve actuating system of FIG. 1 under condition that a front cover is removed from the exhaust valve timing varying mechanism.

As shown in FIG. 8, the exhaust VTC 3 of this example is of a vane type like the intake VTC 2. The exhaust VTC 3 includes a timing sprocket 60 for transmitting rotation from the crankshaft to an exhaust camshaft 106 (shown in FIG. 1); a vane member 61 which is fixed to one end of exhaust camshaft 106 and received rotatably in the timing sprocket 60; and a hydraulic circuit to rotate vane member 61 in the forward and reverse directions by the use of an oil pressure.

Timing sprocket 60 includes a housing 62 receiving the vane member 61 rotatably; a front cover shaped like a circular disk and arranged to close a front opening of housing 62; and a rear cover shaped approximately like a circular disk and arranged to close a rear opening of housing 62. Housing 62 is sandwiched between the front and rear covers, and joined with these covers to form a unit, by four small diameter bolts 63 extending in the axial direction of exhaust camshaft 106. Housing 62 is in the form of a hollow cylinder having the front and rear openings. Housing 62 includes a plurality of shoes 62a projecting radially inwards from the inside circumferential surface and serving as a partition. In this example, four of the shoes 62a are arranged at intervals of about 90 degrees. The rear cover includes a toothed portion 60a formed integrally on the rear side, and arranged to engage with a timing chain, as in the case of the intake VTC 2.

Vane member 61 includes a central vane rotor 61a and a plurality of vanes 61b projecting radially outwards from the vane rotor 61a. In this example, four of the vanes 61b are arranged at angular intervals of approximately 90 degrees circumferentially around vane rotor 61a. Vane rotor 61a is annular and includes a center bolt hole at the center. Vanes 61b are integral with vane rotor 61a. Vane member 61 is fixed to the front end of exhaust camshaft 106 by a fixing bolt 64 extending axially through the center bolt hole of vane rotor 61*a*. An advance fluid pressure chamber 65 and a retard fluid pressure chamber 66 are formed on both sides of each vane 61*b*. Accordingly, there are four of the advance fluid pressure chambers 65 and four of the retard fluid pressure chambers 66.

The hydraulic circuit of the exhaust VTC 3 has a construction identical to the construction of the hydraulic circuit of the intake VTC 2, except that a directional control valve corresponding to directional control valve 47 has three positions reversed with respect to a vertical line as viewed in FIG. 5. The hydraulic circuit includes a first fluid passage leading to the advance fluid pressure chambers 65 to supply and drain an advance fluid pressure of an operating oil to and from advance fluid pressure chambers 65; a second fluid passage leading to the retard fluid pressure chambers 66 to supply and drain a retard fluid pressure of the operating oil to and from retard fluid pressure chambers 66; and the directional control valve connecting the first fluid passage and second fluid passage selectively with a supply passage and a drain passage. The directional control valve includes a movable valve element inside, and operates under control of controller 22.

The directional control valve of the exhaust VTC 3 is arranged to connect the supply passage to the second fluid passage leading to retard fluid pressure chambers 66, and connect the drain passage to the first fluid passage leading to advance fluid pressure chambers 65, when no control current is supplied to the directional control valve. The directional control valve includes a coil spring arranged to mechanically bias the valve element toward this default position.

The exhaust VTC 3 includes a lock mechanism disposed between vane member 61 and housing 62 for locking or allowing the rotation of vane member 61 with respect to housing 62. Specifically, this lock mechanism is disposed between the rear cover 36 and the larger vane 62*b*. The lock mechanism includes a slide hole, a lock pin 67, a lock recess, a spring retainer, and a coil spring, similarly as in the case of the intake VTC 2. When the engine is at rest, and the vane member 61 is located in the most retarded position as shown in FIG. 8, then the lock pin 67 is inserted and fitted in the lock recess under the biasing force of the coil spring, so as to prevent the vane member 61 from rotating relative to housing 62, and thus stably hold the vane member 61.

Between one side surface of each vane 62*b* and a confronting side surface of an adjacent one of the shoes 62*a*, there are disposed a pair of coil springs 68 and 69 serving as biasing means for urging the vane member 61 in the retard rotational direction. In other words, coil springs 68 and 69 serve as a biasing device arranged to bias the exhaust VTC 3 in a direction to retard the exhaust valve opening timing EVO and exhaust valve closing timing EVC. When the oil pump supplies no hydraulic pressure or a lower hydraulic pressure below a predetermined level, for example, when the engine is at rest, or immediately after the engine is started, then the vane member 61 is biased in the counterclockwise direction as viewed in FIG. 8, so as to rotate the exhaust camshaft 106 to the most retarded position.

Figure 9:
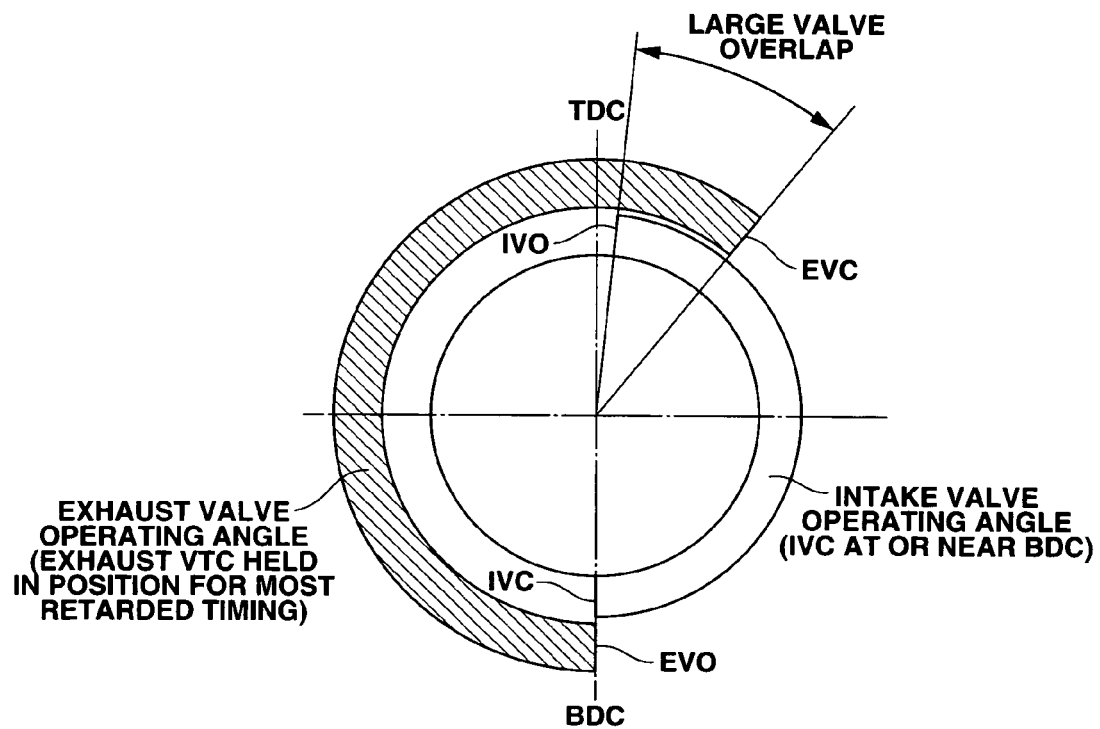
FIG. 9 is a schematic diagram showing characteristics of operation of intake valves and exhaust valves of the engine at the time of start of the engine in the first embodiment.

The following describes how the variable valve actuating system according to the first embodiment operates. When the engine is at rest before started up after stopped, then the vane member 61 of the exhaust VTC 3 is mechanically and stably positioned and held at the position shown in FIG. 8 by the biasing force of coil springs 68, 69 and the lock mechanism. Accordingly, the exhaust VTC 3 is positioned so that the exhaust valve opening timing EVO and exhaust valve closing timing EVC are most retarded and held mechanically and stably, as shown in FIG. 9. On the other hand, when the engine is at rest, then the vane member 32 of the intake VTC 2 is mechanically and stably positioned and held at the position shown in FIG. 6 by the biasing force of coil springs 55, 56 and the lock mechanism. Accordingly, the intake VTC 2 is positioned so that the intake valve opening timing IVO and intake valve closing timing IVC are most advanced and held mechanically and stably, as shown in FIG. 9. Moreover, the intake VEL 1 is positioned so that the operating angle and lift of intake valves 4 are set to the medium operating angle D2 and medium lift L2 which are smaller than the maximum operating angle D3 and maximum lift L3.

When the intake VEL 1, intake VTC 2 and exhaust VTC 3 are located in such default operating positions, there is produced a relatively large valve overlap between the exhaust valve closing timing EVC and intake valve opening timing IVO, as shown in FIG. 9. Also, the intake valve closing timing IVC is mechanically held at or near bottom dead center by the intake VEL 1 and the intake VTC 2, and the exhaust valve opening timing EVO is mechanically held at or near bottom dead center by the exhaust VTC 3.

Thus, the intake VEL 1 is arranged to hold the intake valve operating angle smaller by a predetermined amount than a predetermined maximum value, or hold the intake valve operating angle at a predetermined middle value between a predetermined maximum value and a predetermined minimum value so as to hold the intake valve closing timing IVC at or near bottom dead center, before startup of the engine. The intake VTC 2 is arranged to hold the intake valve opening timing IVO and the intake valve closing timing IVC at respective predetermined relatively advanced timings, i.e. at respective predetermined most advanced timings, before startup of the engine. The exhaust VTC 3 is arranged to hold the exhaust valve opening timing EVO and the exhaust valve closing timing EVC retarded by a predetermined amount from respective predetermined most advanced timings, before startup of the engine. Specifically, the exhaust VTC 3 is arranged to hold the exhaust valve opening timing EVO and the exhaust valve closing timing EVC at respective predetermined most retarded timings, before startup of the engine. Thus, the intake VEL 1, the intake VTC 2, and the exhaust VTC 3 are arranged to hold the intake valve opening timing IVO advanced from the exhaust valve closing timing EVC so as to produce a valve overlap period, before startup of the engine.

According to the thus-constructed variable valve actuating system, when the engine is started by cranking from a cold state, then a part of a burned gas of a high temperature and high pressure inversely flows through the combustion chamber, and intake valves 4, to an intake passage of a low temperature and low pressure, during the relatively large valve overlap from the intake valve opening timing IVO to the exhaust valve closing timing EVC. As a result, a fresh air in the intake passage is heated. That is, the fresh air is heated by increasing the amount of a remaining gas in the cylinder. This is effective for reducing the amount of hydrocarbons generated during cold start, and improving the exhaust emission performance.

The exhaust valve opening timing EVO at or near bottom dead center is effective for promoting the burning of hydrocarbons until the exhaust valve opening timing EVO, and thereby further reducing the amount of exhaust emissions.

The intake valve closing timing IVC at or near bottom dead center is effective for providing a high effective compression ratio so as to improve the combustion and engine startability, stabilizing the rotation of the engine, and further improving the exhaust emission performance.

When the engine starts to produce complete explosions and the engine speed increases after cranking operation, then the discharge pressure of oil pump 49 increases so as to increase the fluid pressure in advance fluid pressure chamber 41 of the intake VTC 2 and the fluid pressure in retard fluid pressure chamber 66 of the exhaust VTC 3, so that the lock pin comes out of the lock recess in each lock mechanism. Although the lock recess of the exhaust VTC 3 is arranged to receive a fluid pressure from retard fluid pressure chamber 66, the lock recess may be constructed to receive the pump discharge pressure in order to provide similar functions. After the lock pins are released, the vane members 32, 61 are allowed to freely rotate, and controlled by controller 22 in accordance with the engine operating state.

Figure 10:
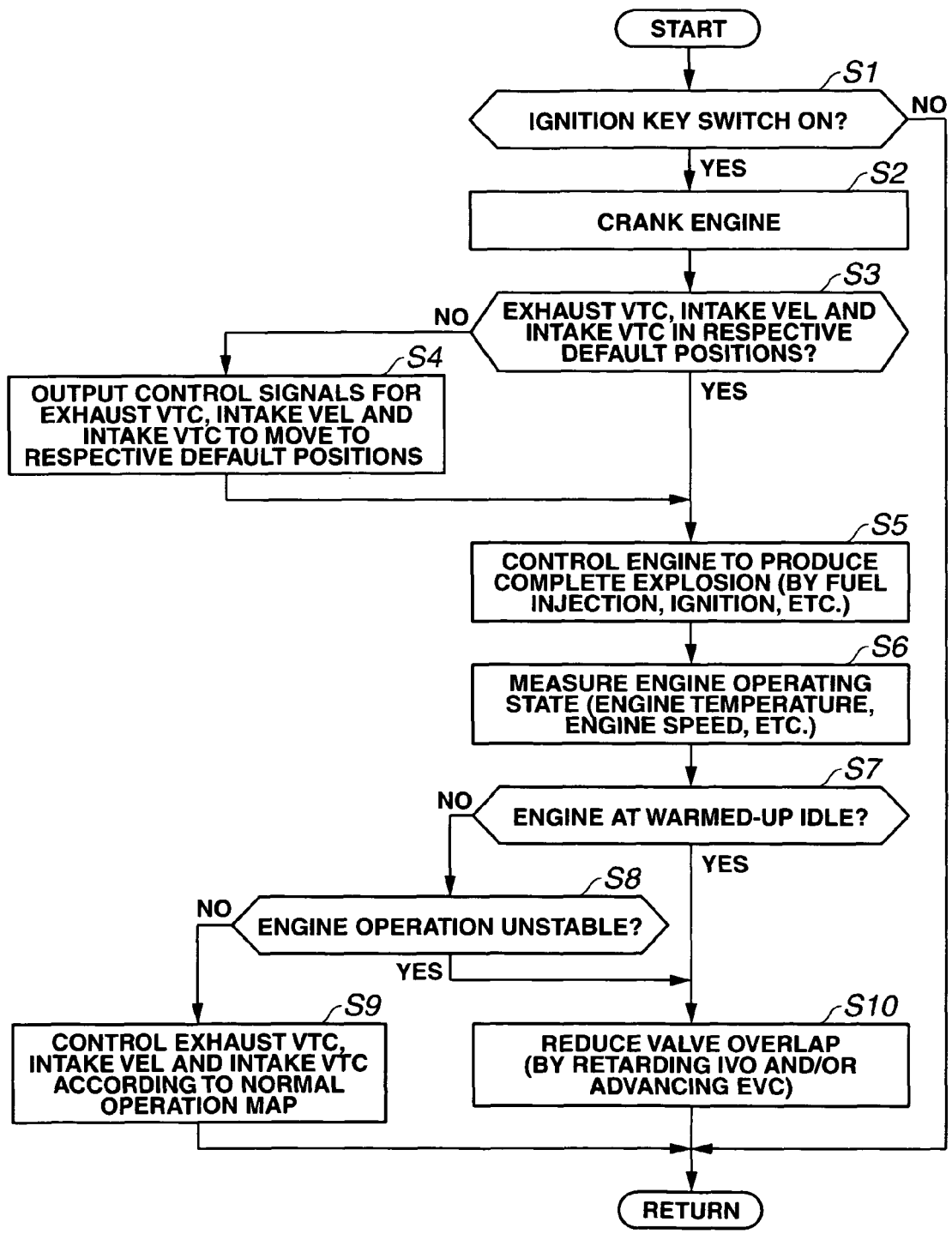
FIG. 10 is a flow chart showing a control process to be performed by a controller in the variable valve actuating system of FIG. 1.

The following describes how controller 22 operates during engine start and thereafter, with reference to FIG. 10.

At Step S1, controller 22 determines whether or not the ignition key switch is ON. When determining that the ignition key switch is not ON, then controller 22 returns from this control process. On the other hand, when determining that the ignition key switch is ON, then controller 22 proceeds to Step S2. At Step S2, controller 22 starts to crank the engine.

At Step S3, controller 22 determines whether or not the intake VEL 1, the intake VTC 2 and the exhaust VTC 3 are in respective default positions. Specifically, controller 22 determines whether or not the intake valve operating angle is equal to the medium value D2, the maximum lift phase of intake valves 4 is most advanced, and the maximum lift phase of the exhaust valves is most retarded. When determining that the intake VEL 1, the intake VTC 2 and the exhaust VTC 3 are not in respective default positions, then controller 22 proceeds to Step S4. At Step S4, controller 22 outputs control signals to the intake VEL 1, the intake VTC 2 and the exhaust VTC 3 so that they may move to the respective default positions. On the other hand, when determining that the intake VEL 1, the intake VTC 2 and the exhaust VTC 3 are in respective default positions, then controller 22 proceeds to Step S5.

At Step S5, controller 22 operates the engine to produce complete explosions by outputting control signals to fuel injectors and ignition devices, and thus starts cold-state combustion. During about a few seconds after engine start, the combustion and the exhaust emission performance are improved as discussed above.

As the pump discharge pressure increases after engine start, the fluid pressures in the advance fluid pressure chamber 41 of the intake VTC 2 and the retard fluid pressure chamber 66 of the exhaust VTC 3 increase so that the lock pins are released in the lock mechanisms so as to allow free rotation of the vane member 32 and vane member 61.

At Step S6, controller 22 identifies the current engine operating state on the basis of information concerning engine temperature, engine speed, etc. Then, at Step S7, controller 22 determines whether or not the engine is at warming-up idle (at idle after warmed-up). When determining that the engine is not at warming-up idle, then controller 22 proceeds to Step S8. At Step S8, controller 22 measures fluctuations of rotation of the engine on the basis of the information from the crank angle sensor 27, and determines whether or not the engine operation is unstable. When determining that the engine operation is not unstable, then controller 22 proceeds to Step S9. At Step S9, controller 22 controls the intake VEL 1, the intake VTC 2 and the exhaust VTC 3 according to a predetermined normal operation map.

Figure 11:
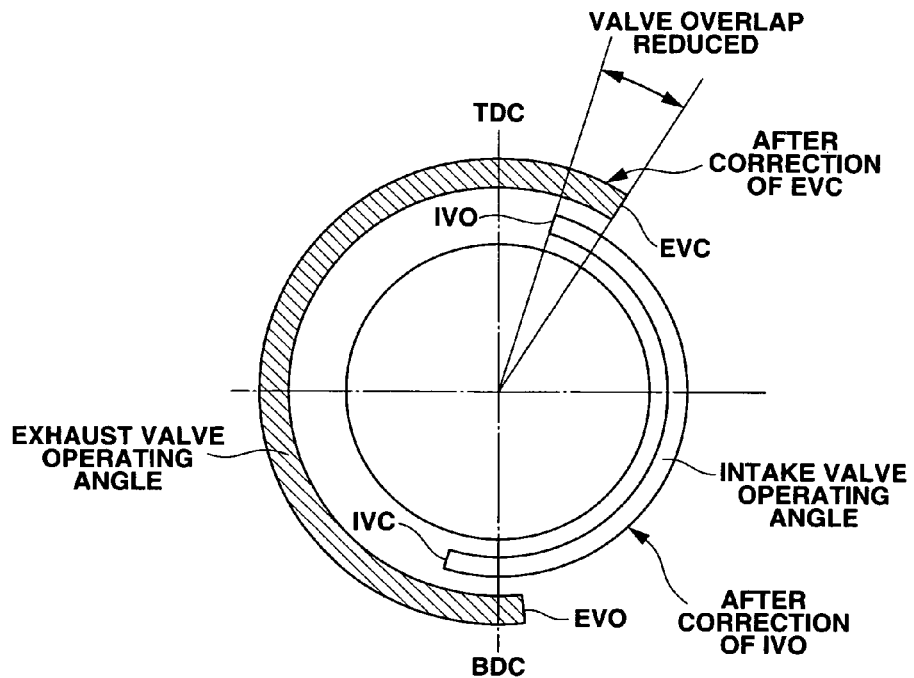
FIG. 11 is a schematic diagram showing characteristics of operation of the intake valves and exhaust valves after a correction produced by the variable valve actuating system of FIG. 1.

On the other hand, when determining at Step S7 that the engine is at warming-up idle, then controller 22 proceeds to Step S10. Also, when determining at Step S8 that the engine operation is unstable, then controller 22 proceeds to Step S10. At Step S10, controller 22 reduces the valve overlap by retarding the intake valve opening timing IVO and advancing the exhaust valve closing timing EVC. When the engine is warmed up, the discharge pressure of oil pump 49 is sufficiently high, and the lock mechanisms are released from their respective lock states. As shown in FIG. 11, in the exhaust VTC 3, the vane member 61 is rotated in the clockwise direction as viewed in FIG. 8 against the biasing force of coil springs 68, 69, so as to slightly advance the exhaust valve opening timing EVO from the state shown in FIG. 9. On the other hand, in the intake VTC 2, the vane member 32 is rotated to the position shown in FIG. 7 against the biasing force of coil springs 55, 56, so as to slightly retard the intake valve closing timing IVC. The reduction of the valve overlap may be implemented by one of retarding the intake valve opening timing IVO and advancing the exhaust valve closing timing EVC. Thus, controller 22 is configured to perform at least one of first and second corrective actions, when determining that the engine is warmed up and at idle, or when determining that the engine is in a state of unstable combustion, wherein the first corrective action is to advance the exhaust valve closing timing EVC by the exhaust VTC 3, and the second corrective action is to retard the intake valve opening timing IVO by the intake VTC 2.

The foregoing control process provides a better condition for the combustion, and stabilizes the engine rotation. In general, when the engine is at warmed-up idle, the combustion tends to be unstable due to the remaining gas, because the engine load is low. In such situations, the variable valve actuating system according to the first embodiment corrects or reduces the valve overlap, so as to prevent the engine from being unstable. Since the engine is stable, it is unnecessary to measure fluctuations of the engine rotation. This is effective for simplifying the control process.

Figure 12:
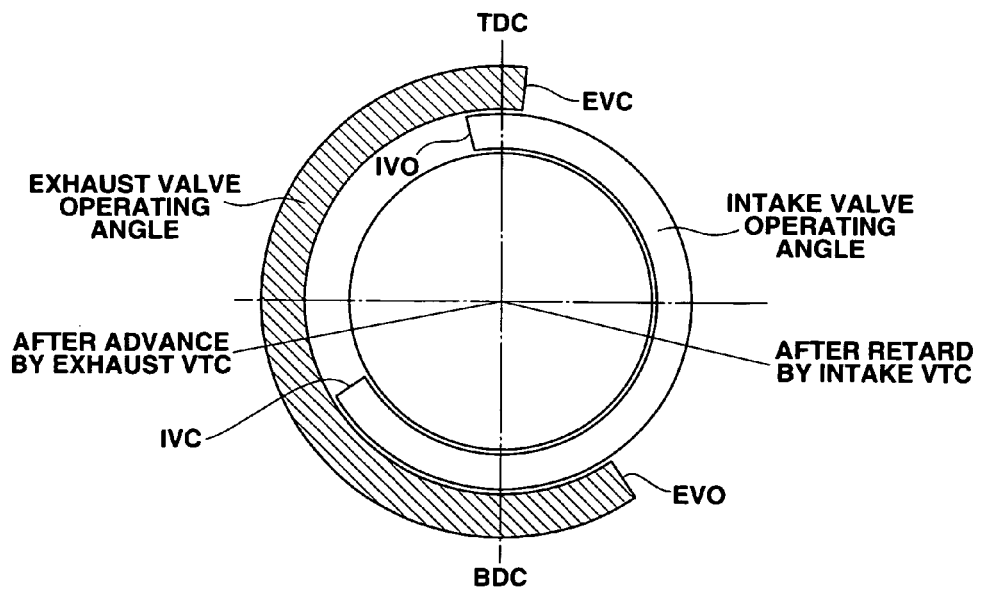
FIG. 12 is a schematic diagram showing an example of characteristics of operation of the intake valves and exhaust valves under control of the variable valve actuating system of FIG. 1.

When the engine enters a predetermined normal operating region (including the middle speed and middle load region, and the high speed and high load region), then controller 22 controls the intake VEL 1, the intake VTC 2 and the exhaust VTC 3 with reference to the normal operation map. Specifically, as shown in FIG. 12, controller 22 allows the intake VEL 1 to set the intake valve operating angle at the middle operating angle D2 (or the maximum operating angle D3), and allows the intake VTC 2 to set the intake valve opening timing IVO and intake valve closing timing IVC at relatively retarded timings. As a result, the intake valve closing timing IVC is much later than bottom dead center. This is effective for increasing the fresh air charging efficiency so as to increase the combustion torque in the middle and high speed region. On the other hand, controller 22 allows the exhaust VTC 3 to set the exhaust valve opening timing EVO and the exhaust valve closing timing EVC at relatively advanced timings. As a result, the exhaust valve opening timing EVO is sufficiently early, so as to reduce the loss in pressing out the exhaust gas in the middle and high speed region. In summary, the variable valve actuating system according to the first embodiment can improve the fresh air charging efficiency and reduce the loss in pressing out the exhaust gas, so as to increase the engine output torque in the middle and high speed region.

Figure 13:
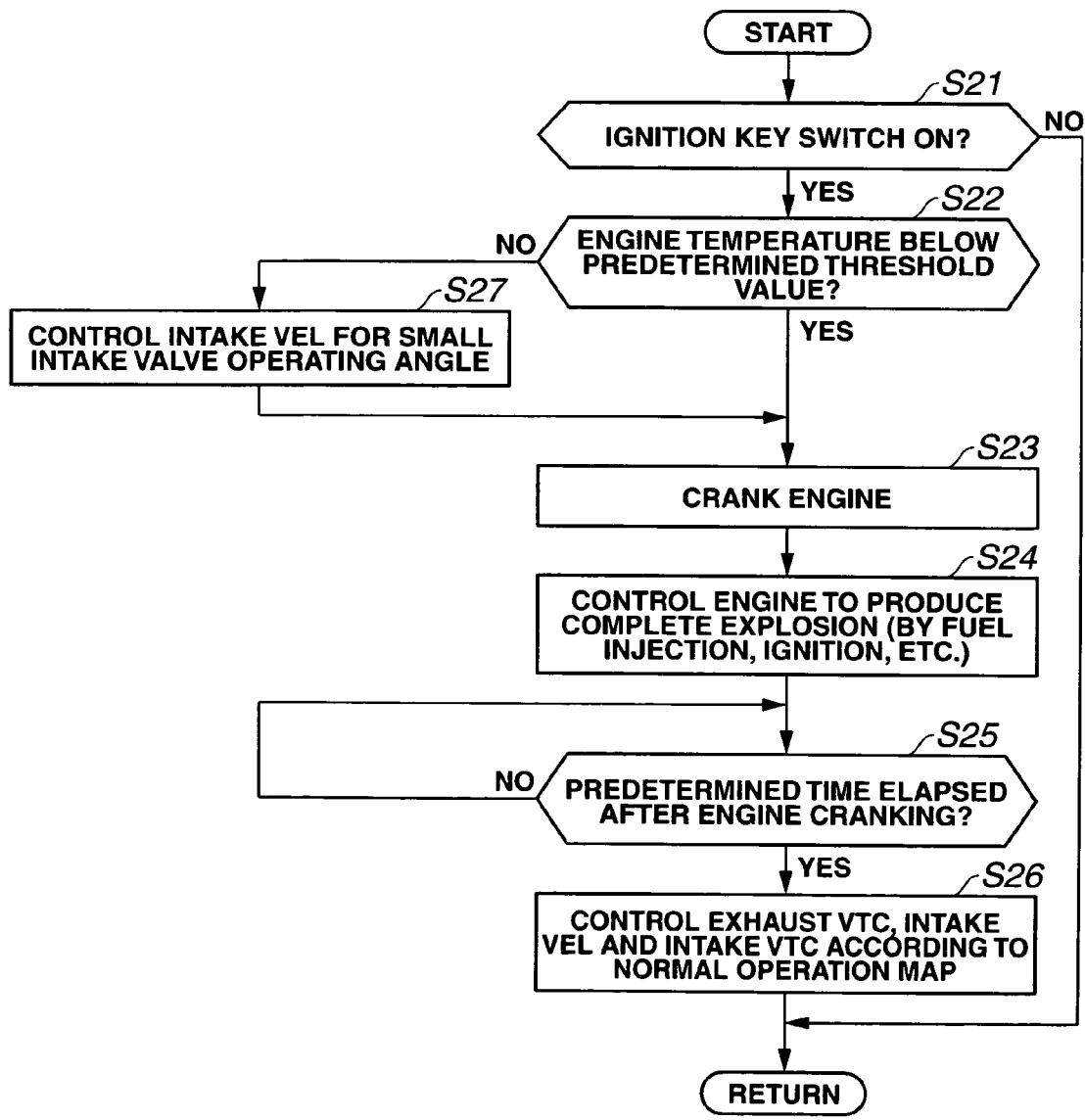
FIG. 13 is a flow chart showing another control process to be performed by the controller.
Figure 14:
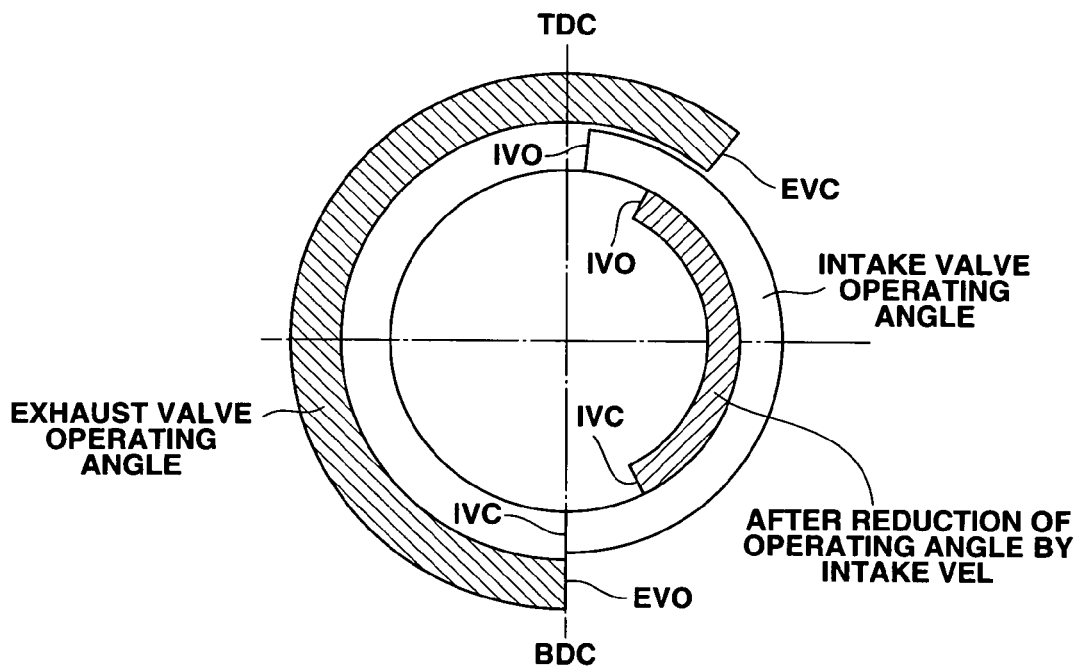
FIG. 14 is a schematic diagram showing characteristics of operation of the intake valves and exhaust valves after an intake valve operating angle is reduced by the variable valve actuating system in the control process of FIG. 13.

Controller 22 is configured to perform another control process as shown in FIG. 13. At Step S21, controller 22 determines whether or not the ignition key switch is ON. When determining that the ignition key switch is not ON, then controller 22 returns from this control process. On the other hand, when determining that the ignition key switch is ON, then controller 22 proceeds to Step S22.

At Step S22, controller 22 determines whether or not the engine temperature is below a predetermined threshold value. When determining that the engine temperature is below the threshold value, then controller 22 proceeds to Step S23. At Step S23, controller 22 starts to crank the engine. Then, at Step S24, controller 22 operates the engine to produce complete explosions by outputting control signals to fuel injectors and ignition devices, and thus starts cold-state combustion. Then, at Step S25, controller 22 determines whether or not a predetermined time has elapsed after the engine cranking operation, using a timer. When determining that the predetermined time has not yet elapsed after the engine cranking operation, then controller 22 returns to Step S25. On the other hand, when determining that the predetermined time has elapsed after the engine cranking operation, then controller 22 proceeds to Step S26.

At Step S26, controller 22 controls the intake VEL 1, the intake VTC 2 and the exhaust VTC 3 according to the normal operation map.

When determining at Step S22 that the engine temperature is not below the threshold value, then controller 22 proceeds to Step S27. At Step S27, controller 22 allows the intake VEL 1 to reduce the intake valve operating angle. In this example, controller 22 allows to the intake VEL 1 to set the intake valve operating angle at the minimum operating angle D1 (minimum lift L1). As a result, the intake valve closing timing IVC is set prior to bottom dead center, so as to provide a low effective compression ratio. This is effective for prevention of preignition. The intake valve closing timing IVC can be changed even when the pump discharge pressure is low before engine cranking operation, because the intake VEL 1 is driven by the electric motor.

In this way, the variable valve actuating system according to the first embodiment not only improves the exhaust emission performance, but also prevents preignition which tends to occur when the engine temperature is high. After completing the operation of Step S27, the controller 22 proceeds to Step S23.

Figure 15:
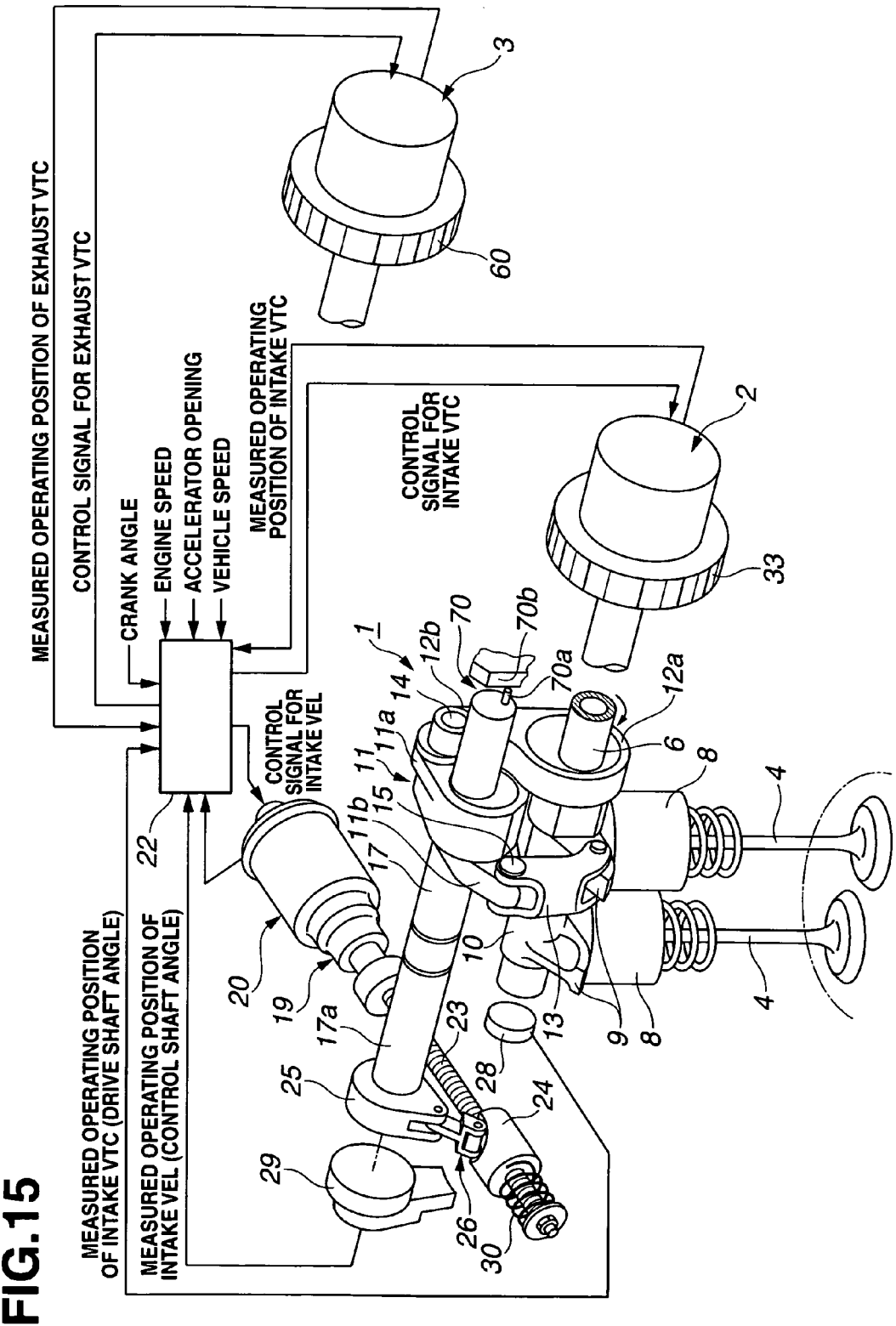
FIG. 15 is a schematic diagram showing an internal combustion engine system including a variable valve actuating system or apparatus according to a second embodiment of the present invention, showing a perspective view of an intake valve operating angle varying mechanism, an intake valve timing varying mechanism, and an exhaust valve timing varying mechanism in the variable valve actuating system.

The following describes a variable valve actuating system according to a second embodiment of the present invention. The second embodiment is created by modifying the first embodiment as follows. The intake VEL 1 is arranged to hold the intake valve operating angle at a predetermined value closer (or equal) to a predetermined minimum value than to a predetermined maximum value so as to hold the intake valve closing timing IVC at or near bottom dead center, before startup of the engine. As shown in FIG. 15, the intake VEL 1 includes only first coil spring 30 and no second coil spring 31. Accordingly, when the engine is at rest, the ball nut 24 is urged by first coil spring 30 toward electric motor 20 so as to mechanically hold the minimum operating angle D1 (minimum lift L1). The intake VEL 1 includes a stopper mechanism 70 disposed between control shaft 17 and cylinder head S for restricting the rotation angle of control shaft 17 within a position for the minimum operating angle.

Stopper mechanism 70 includes a stopper pin 70a which is formed at one end of control shaft 17 and extends in the axial direction; and a stopper surface 70b defined in an upper end portion of cylinder head S, and adapted to be in contact with stopper pin 70a so as to restrict the rotation of stopper pin 70a.

Figure 16:
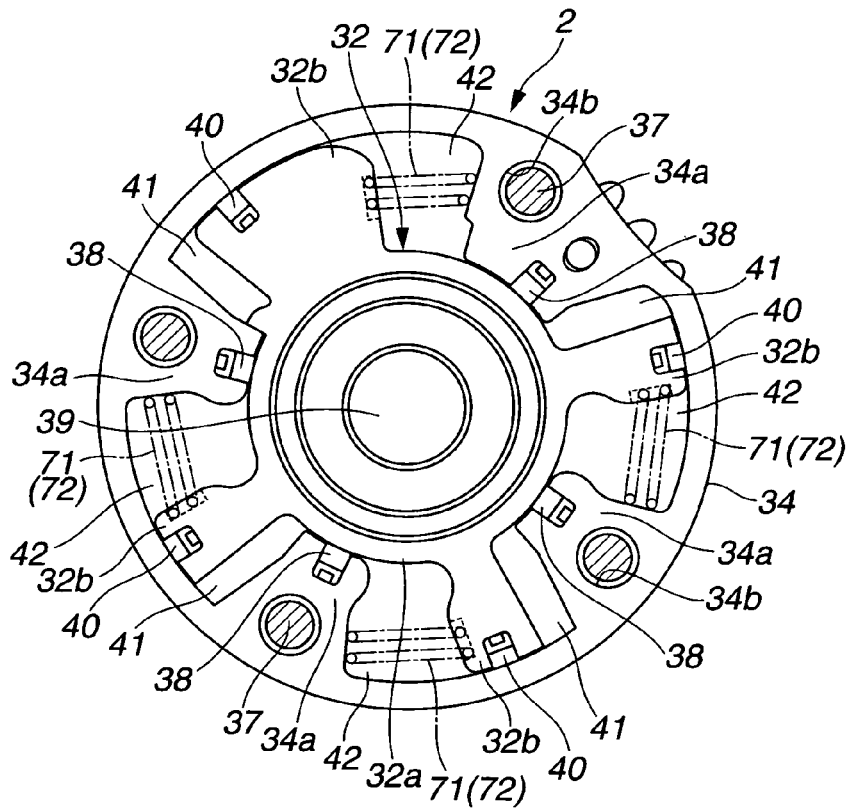
FIG. 16 is a front view of the intake valve timing varying mechanism in the variable valve actuating system of FIG. 15 under condition that a front cover is removed from the intake valve timing varying mechanism.

As shown in FIG. 16, the intake VTC 2 includes no coil springs 55, 56, but includes coil springs 71, 72 which are disposed in retard fluid pressure chamber 42 for urging the vane member 32 to the retard rotational direction. The intake VTC 2 includes no lock mechanism disposed between vane member 32 and rear cover 36 for locking the vane member 32 at the most retarded position. Thus, the intake VTC 2 is arranged to hold the intake valve opening timing IVO and the intake valve closing timing IVC at respective predetermined relatively retarded timings, i.e. at respective predetermined most retarded timings, before startup of the engine.

Before the engine is started, the vane member 32 is mechanically and stably held at the most retarded position shown in FIG. 16 by the biasing force of coil springs 71, 72. This is because the vane member 32 is also mechanically held at the most retarded position due to frictions applied to drive shaft 6, although the intake VTC 2 includes no lock mechanism. The exhaust VTC 3 has the same construction as in the first embodiment. Specifically, the exhaust VTC 3 includes the lock mechanism, and mechanically holds the vane member 61 in the most retarded position.

Figure 17:
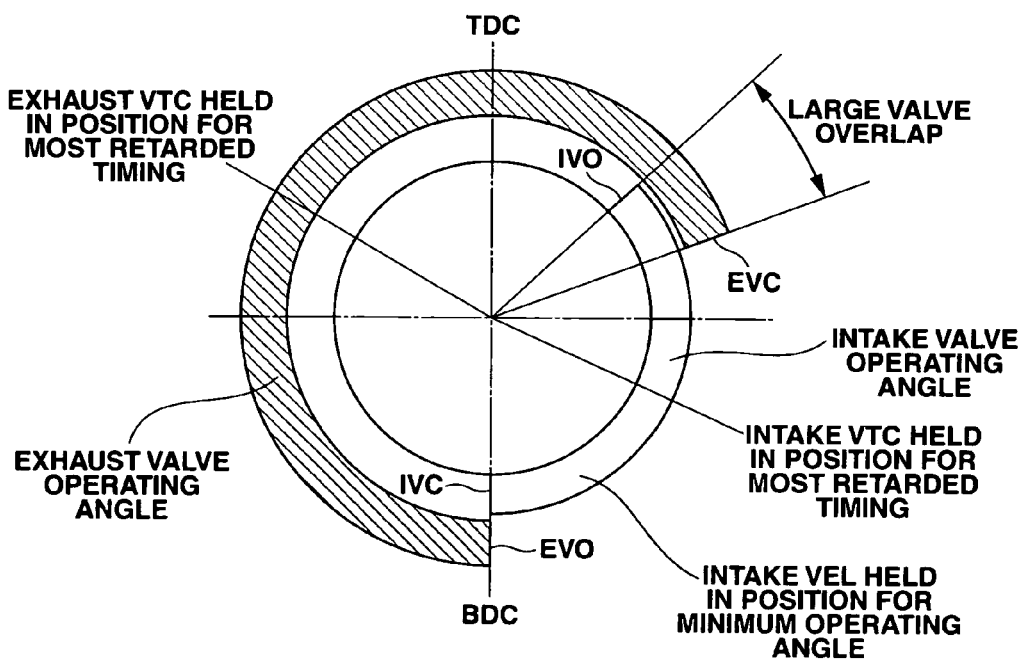
FIG. 17 is a schematic diagram showing characteristics of operation of intake valves and exhaust valves of the engine at the time of start of the engine in the second embodiment.
Figure 18:
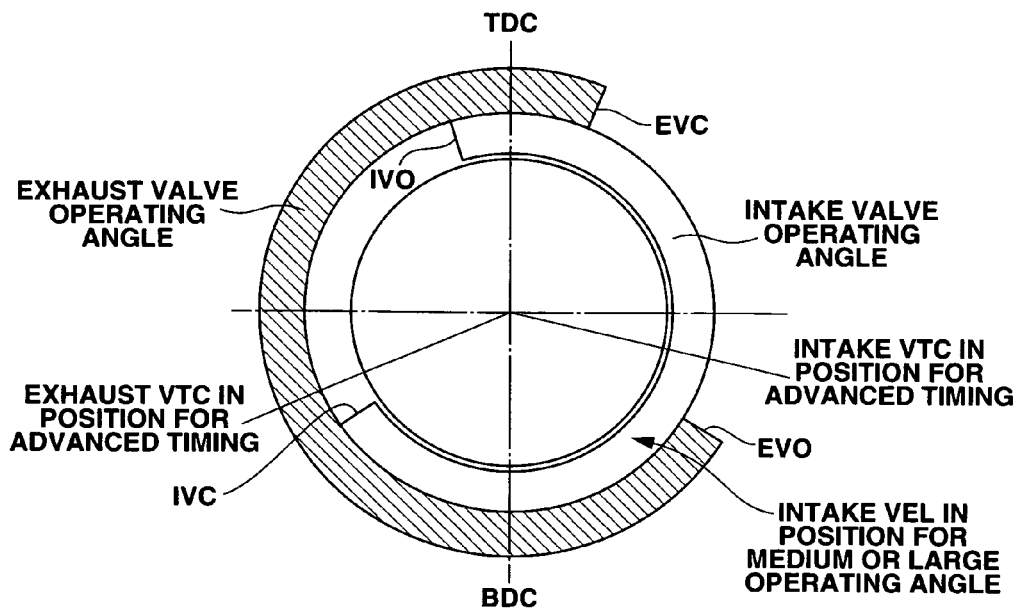
FIG. 18 is a schematic diagram showing an example of characteristics of operation of the intake valves and exhaust valves under control of the variable valve actuating system of FIG. 15.

According to the second embodiment, when the engine is at rest or immediately after the engine is started, the intake valve opening timing IVO, the intake valve closing timing IVC, the exhaust valve opening timing EVO and the exhaust valve closing timing EVC are held mechanically and stably in their respective default positions as shown in FIG. 17. Thus, the variable valve actuating system provides a large valve overlap by holding the exhaust valve closing timing EVC most retarded, although the intake valve opening timing IVO is relatively retarded as compared to the first embodiment. Accordingly, a part of a burned gas of a high temperature and high pressure inversely flows through the combustion chamber, and intake valves 4, to an intake passage of a low temperature and low pressure, during the relatively large valve overlap from the intake valve opening timing IVO to the exhaust valve closing timing EVC. As a result, a fresh air in the intake passage is heated. This is effective for reducing the amount of hydrocarbons generated during cold start, and improving the exhaust emission performance.

The exhaust valve opening timing EVO late at or near bottom dead center is effective for flowing the exhaust gas to an exhaust passage after burning hydrocarbons sufficiently, and therefore improving the cold-state exhaust emission performance.

Also, the intake valve closing timing IVC at or near bottom dead center is effective for providing a high effective compression ratio, and thereby producing stable combustion and stable engine rotation.

The minimum operating angle and lift of intake valves 4 is effective for minimizing the frictions applied to the intake VEL 1 so as to allow the engine to increase the engine speed more quickly. This improves the startability of the engine, and reduces the fuel consumption. This is also effective for improving the exhaust emission performance.

After the engine starts to produce complete explosions, the discharge pressure of oil pump 49 is sufficiently high so that the lock mechanisms are released from the lock states and vane member 32 and vane member 61 are allowed to rotate freely and controlled with the directional control valves by controller 22 according to the engine operating state. For example, when the engine is in a predetermined high speed and high load region, controller 22 allows the intake VEL 1 to set the intake valve operating angle at the maximum value D3 (L3), and allows the intake VTC 2 to advance the intake valve opening timing IVO and intake valve closing timing IVC. As a result, the intake valve closing timing IVC is sufficiently late relative to bottom dead center, so as to increase the fresh air charging efficiency. Also, the exhaust valve opening timing EVO sufficiently early relative to bottom dead center is effective for reducing the loss in pressing out the exhaust gas in the high speed region. The variable valve actuating system thus produces large engine output torques.

Figure 19:
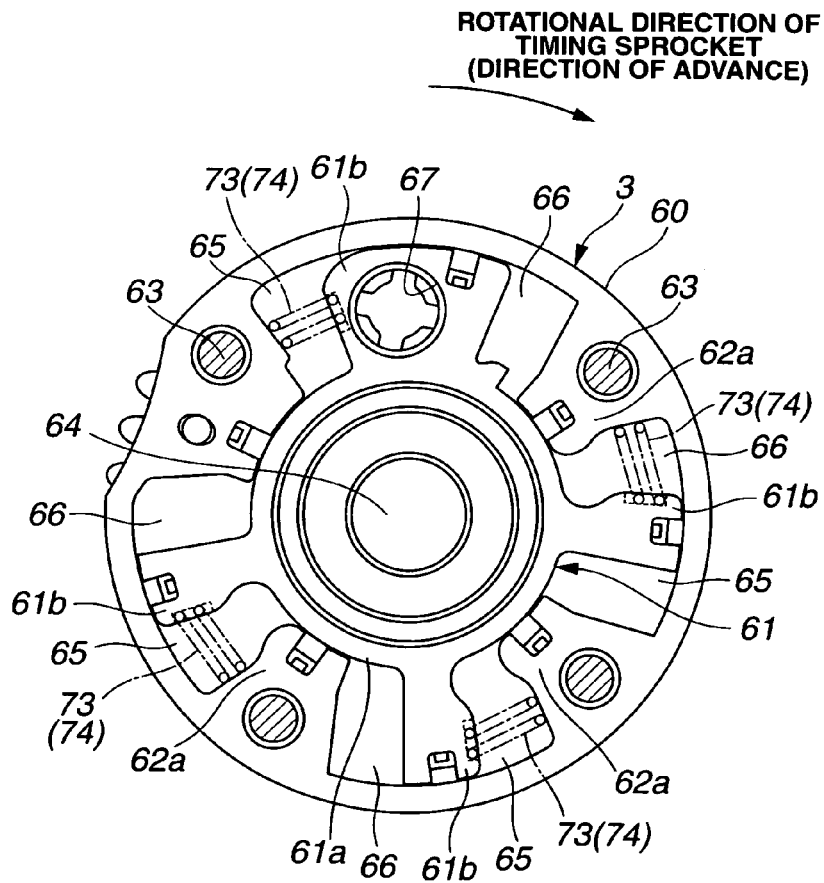
FIG. 19 is a front view of an exhaust valve timing varying mechanism in a variable valve actuating system or apparatus for an internal combustion engine according to a third embodiment of the present invention under condition that a front cover is removed from the exhaust valve timing varying mechanism.

The following describes a variable valve actuating system or apparatus according to a third embodiment of the present invention. The third embodiment is created by modifying the first embodiment as follows. As shown in FIG. 19, the exhaust VTC 3 includes coil springs 73, 74 disposed in retard fluid pressure chambers 66 for urging the vane member 61 in the advance rotational direction. Coil springs 73, 74 are arranged to rotate the vane member 61 in the advance rotational direction toward a default position which is located a predetermined distance from the most retarded position, when the engine is at rest. When timing sprocket 60 is rotated, vane member 61 tends to relatively rotate in the retard rotational direction due to frictions applied to the exhaust VTC 3. However, coil springs 73, 74 serve to bias the vane member 61 to move in the advance rotational direction toward the default position. The lock mechanism is arranged to lock the vane member 61 in the default position. Accordingly, when the engine is at rest, the vane member 61 is mechanically held in an intermediate position as a default position between the most retarded position and the most advanced position. That is, when the engine is at rest, the exhaust VTC 3 is held in an intermediate default position for intermediate exhaust valve timings, as shown in FIG. 20.

The variable valve actuating system according to the third embodiment includes no intake VEL 1. The intake VTC 2 according to the third embodiment has the same construction as in the first embodiment. Specifically, the vane member 32 is urged by coil springs 55, 56 toward the most advanced position. Therefore, when the engine is at rest, the intake VTC 2 is held in the most advanced position as a default position, as shown in FIG. 20.

Figure 20:
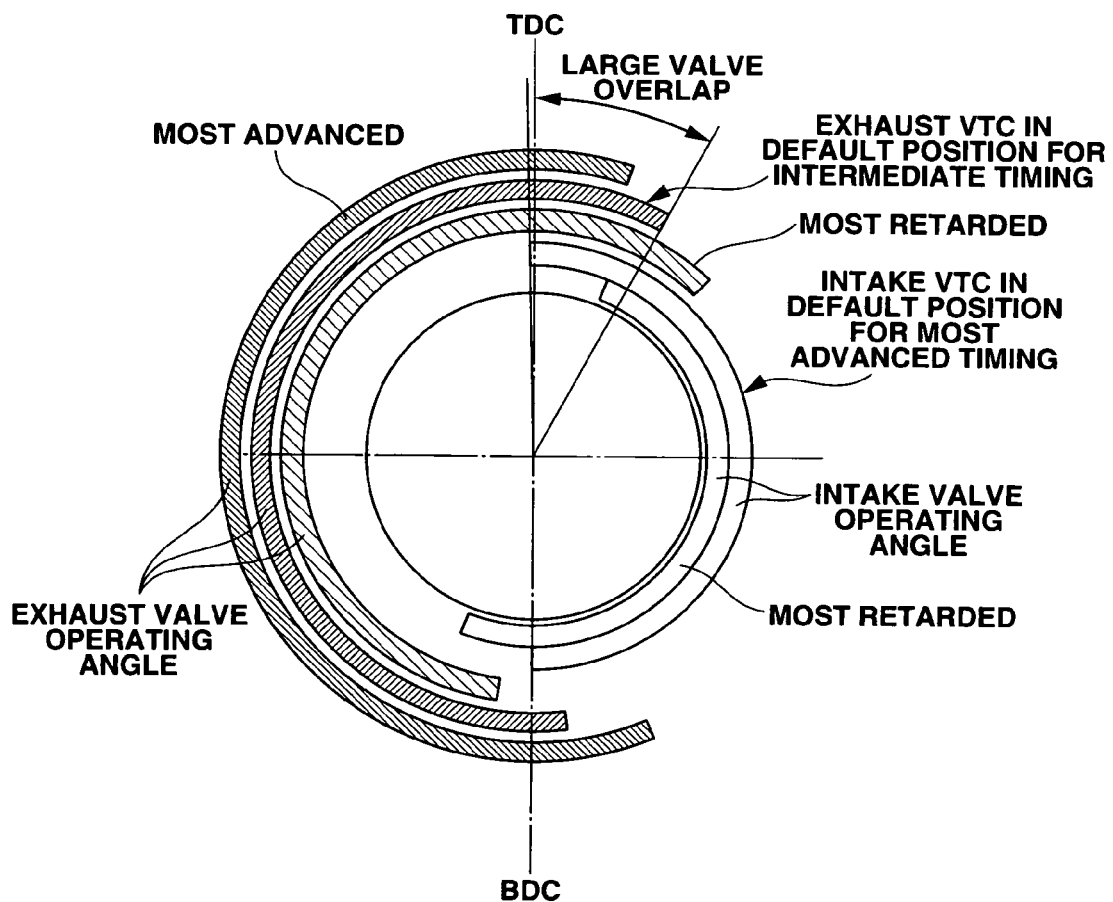
FIG. 20 is a schematic diagram showing characteristics of operation of intake valves and exhaust valves of the engine at the time of start of the engine in the third embodiment.

According to the third embodiment, when the engine is at rest or immediately after the engine is started, the exhaust VTC 3 mechanically holds the vane member 61 in the intermediate position, so as to hold the exhaust valve opening timing EVO and exhaust valve closing timing EVC in respective intermediate positions, as shown in FIG. 20. On the other hand, the intake VTC 2 mechanically holds the vane member 32 in the most advanced position, so as to hold the intake valve opening timing IVO and intake valve closing timing IVC in respective most advanced positions. Therefore, the variable valve actuating system provides a large valve overlap, and improves the cold-state exhaust emission performance.

After the lock mechanisms are released from respective lock states, the exhaust VTC 3 is controlled to be between the most retarded position and the most advanced position. The intake VTC 2 is also controlled to be between the most retarded position and the most advanced position.

In the third embodiment, the lift of intake valves 4 is constant and relatively large, because the variable valve actuating system includes no intake VEL 1 for varying the operating angle and lift of intake valves 4. If the exhaust valve opening timing EVO and exhaust valve closing timing EVC are held at the most retarded timings as in the first embodiment, then the valve overlap may be excessively large. This may increase the amount of the remaining gas in the cylinder, reducing the amount of fresh air in the cylinder, and thereby adversely affecting the combustion during cold start. However, the intermediate default position of vane member 61 of the exhaust VTC 3 is effective for providing a suitable valve overlap. Thus, according to the third embodiment, it is possible to reduce the exhaust emissions when the engine is in cold state and improve the combustion when the engine is warmed up, only by means of the intake VTC 2 and exhaust VTC 3 which can be prepared with a relatively low cost.

The foregoing embodiments may be modified as follows. The intake VEL 1 may be constructed to vary the operating angle and lift of intake valve 4 stepwise.

Although the exhaust VTC 3 according to the first and second embodiments includes coil springs 68, 69 for biasing the vane member 61 in the retard rotational direction, the coil springs may be removed from the exhaust VTC 3. This is because when timing sprocket 60 is rotated, the vane member 61 tends to relatively rotate in the retard rotational direction due to frictions applied to the exhaust VTC 3. However, the coil springs serve for holding the vane member 61 more stably. The lock mechanism also serves for holding the vane member 61 further more stably.

Coil springs 71, 72 may removed from the intake VTC 2 according to the second embodiment. This is because control shaft 17 tends to move in the direction to reduce the lift of intake valves 4 due to a moment caused by reaction forces of valve springs. However, coil springs 71, 72 serve for holding the control shaft 17 more stably.

In the third embodiment, the locking of the vane member in the intermediate position may be implemented by controlling the VTC so as to move the vane member to the intermediate position, allowing the lock pin to come in the lock recess, and stopping the engine.

The intake valve closing timing IVC may be defined as an actual moment when the intake valve is fully closed. Alternatively, the intake valve closing timing IVC may be defined as a moment in a section of a valve operation curve as shown in FIG. 4 where the rate of change of the position of the intake valve decreases from a section of a relatively large gradient to a section of a relatively small gradient. In general, the intake valve closing timing IVC according to the second definition is closer to an actual timing when the intake air is stopped from entering the cylinder.

The variable valve actuating system according to the present embodiments may be applied to a direct fuel injection internal combustion engine in a fuel is injected directly into a combustion chamber. In general, in such a direct fuel injection internal combustion engine, the degree of freedom of fuel injection is high, the degree of freedom of fuel injection timing is high, and the geometrical compression ratio is high, because fuel can be supplied even when all of intake valves and exhaust valves are closed. Accordingly, it may be possible to further improve the combustion. In general, when the valve overlap is large, the large amount of remaining gas flows back into the cylinder, and adversely affects the combustion. However, direct fuel injection serves to improve the combustion basically, and to increase the allowable upper limit of the valve overlap. Thus, when applied to a direct fuel injection internal combustion engine, the variable valve actuating system significantly improves the exhaust emission performance during engine cold start.

This application is based on a prior Japanese Patent Application No. 2007-112559 filed on Apr. 23, 2007. The entire contents of this Japanese Patent Application No. 2007-112559 are hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:
1. A variable valve actuating apparatus for an internal combustion engine, comprising:
  an intake valve operating angle varying mechanism arranged to vary an intake valve operating angle of the internal combustion engine, and to hold an intake valve closing timing of the internal combustion engine at or near bottom dead center, before startup of the internal combustion engine;

an exhaust valve timing varying mechanism arranged to vary an exhaust valve opening timing and an exhaust valve closing timing of the internal combustion engine, while holding constant an exhaust valve operating angle of the internal combustion engine, and to hold the exhaust valve opening timing and the exhaust valve closing timing retarded by a predetermined amount from respective predetermined most advanced timings such that a predetermined valve overlap between intake valve and exhaust valve is produced before the startup of the internal combustion engine; and a controller comprising a section configured to:
perform a first operation before the startup of the internal combustion engine after a stop of the internal combustion engine, wherein the first operation comprises:
setting the intake valve operating angle varying mechanism in a default position to hold the intake valve closing timing of the internal combustion engine at or near bottom dead center; and
setting the exhaust valve timing varying mechanism in a default position to hold the exhaust valve opening timing and the exhaust valve closing timing retarded by the predetermined amount from the respective predetermined most advanced timings such that the predetermined valve overlap between the intake valve and the exhaust valve is produced; and
perform a second operation at the startup of the internal combustion engine, wherein the second operation comprises:
determining whether or not the intake valve operating angle varying mechanism and the exhaust valve timing varying mechanism are in their respective default positions;
outputting a control signal such that the intake valve operating angle varying mechanism and the exhaust valve timing varying mechanism move to their respective default positions, in response to a determination that the intake valve operating angle varying mechanism and the exhaust valve timing varying mechanism are not in their respective default positions; and
outputting a control signal such that the internal combustion engine starts combustion by a fuel injector and an ignition device, in response to a determination that the intake valve operating angle varying mechanism and the exhaust valve timing varying mechanism are in their respective default positions.

2. The variable valve actuating apparatus as claimed in claim 1, wherein the intake valve operating angle varying mechanism is arranged to hold the intake valve operating angle at a predetermined middle value between a predetermined maximum value and a predetermined minimum value such that the intake valve closing timing is held at or near bottom dead center when in the default position of the intake valve operating angle varying mechanism.

3. The variable valve actuating apparatus as claimed in claim 2, wherein the intake valve operating angle varying mechanism includes at least two opposite biasing devices arranged to bias the intake valve operating angle in two opposite directions such that the intake valve operating angle is held at the predetermined middle value.

4. The variable valve actuating apparatus as claimed in claim 1, wherein the intake valve operating angle varying mechanism is arranged to hold the intake valve operating angle at a predetermined value closer to a predetermined minimum value than to a predetermined maximum value such that the intake valve closing timing is held at or near bottom dead center when in the default position of the intake valve operating angle varying mechanism.

5. The variable valve actuating apparatus as claimed in claim 1, wherein the intake valve operating angle varying mechanism includes at least one biasing device arranged to bias the intake valve operating angle such that the intake valve closing timing is held at or near bottom dead center when in the default position of the intake valve operating angle varying mechanism.

6. The variable valve actuating apparatus as claimed in claim 1, wherein the exhaust valve timing varying mechanism is arranged to hold the exhaust valve opening timing and the exhaust valve closing timing at respective predetermined most retarded timings when in the default position of the exhaust valve timing varying mechanism.

7. The variable valve actuating apparatus as claimed in claim 1, wherein the variable valve actuating apparatus is adapted to a direct fuel injection internal combustion engine in which a fuel is injected directly into a combustion chamber.

8. A controller for controlling a variable valve actuating apparatus for an internal combustion engine, the variable valve actuating apparatus comprising: an intake valve operating angle varying mechanism arranged to vary an intake valve operating angle of the internal combustion engine, and an exhaust valve timing varying mechanism arranged to vary an exhaust valve opening timing and an exhaust valve closing timing of the internal combustion engine, while holding constant an exhaust valve operating angle of the internal combustion engine; the controller comprising a section configured to:
perform a first operation before a startup of the internal combustion engine after a stop of the internal combustion engine, wherein the first operation comprises:
setting the intake valve operating angle varying mechanism in a default position to hold the intake valve operating angle smaller by a first predetermined amount than a predetermined maximum value; and
setting the exhaust valve timing varying mechanism in a default position to hold the exhaust valve opening timing and the exhaust valve closing timing retarded by a second predetermined amount from respective predetermined most advanced timings such that a predetermined valve overlap between intake valve and exhaust valve is produced; and
perform a second operation at the startup of the internal combustion engine, wherein the second operation comprises:
determining whether or not the intake valve operating angle varying mechanism and the exhaust valve timing varying mechanism are in their respective default positions;
outputting a control signal such that the intake valve operating angle varying mechanism and the exhaust valve timing varying mechanism move to their respective default positions, in response to a determination that the intake valve operating angle varying mechanism and the exhaust valve timing varying mechanism are not in their respective default positions; and
outputting a control signal such that the internal combustion engine starts combustion by a fuel injector and an ignition device, in response to a determination that the intake valve operating angle varying mechanism and the exhaust valve timing varying mechanism are in their respective default positions.

9. The controller as claimed in claim 8, wherein the variable valve actuating apparatus comprises an intake valve timing varying mechanism arranged to vary an intake valve opening timing and an intake valve closing timing of the internal combustion engine, while holding constant the intake valve operating angle, and wherein the first operation further comprises setting the intake valve timing varying mechanism in a default position to hold the intake valve opening timing and the intake valve closing timing at respective predetermined relatively advanced timings.

10. The controller as claimed in claim 8, wherein the variable valve actuating apparatus comprises an intake valve timing varying mechanism arranged to vary an intake valve opening timing and an intake valve closing timing of the internal combustion engine, while holding constant the intake valve operating angle, and wherein the first operation further comprises setting the intake valve timing varying mechanism in a default position to hold the intake valve opening timing and the intake valve closing timing at respective predetermined relatively retarded timings.

11. The controller as claimed in claim 8, wherein the intake valve operating angle varying mechanism is arranged to hold the intake valve operating angle at a predetermined minimum value when in the default position of the intake valve operating angle varying mechanism.

12. The controller as claimed in claim 8, wherein the variable valve actuating apparatus is adapted to a direct fuel injection internal combustion engine in which a fuel is injected directly into a combustion chamber.

13. The controller as claimed in claim 8, wherein the section is configured to perform at least one of first and second corrective actions, when determining that the internal combustion engine is in a state of unstable combustion, wherein the first corrective action is to advance the exhaust valve closing timing by the exhaust valve timing varying mechanism, and the second corrective action is to retard an intake valve opening timing by an intake valve timing varying mechanism.

14. The controller as claimed in claim 8, wherein the section is configured to perform at least one of first and second corrective actions, when determining that the internal combustion engine is warmed up and at idle, wherein the first corrective action is to advance the exhaust valve closing timing by the exhaust valve timing varying mechanism, and the second corrective action is to retard an intake valve opening timing by an intake valve timing varying mechanism.

15. A controller for controlling a variable valve actuating apparatus for an internal combustion engine, the variable valve actuating apparatus comprising: an intake valve timing varying mechanism arranged to vary an intake valve opening timing and an intake valve closing timing of the internal combustion engine, while holding constant an intake valve operating angle of the internal combustion engine, and an exhaust valve timing varying mechanism arranged to vary an exhaust valve opening timing and an exhaust valve closing timing of the internal combustion engine, while holding constant an exhaust valve operating angle of the internal combustion engine; and the controller comprising a section configured to:
   perform a first operation before a startup of the internal combustion engine after a stop of the internal combustion engine, wherein the first operation comprises:
      setting the intake valve timing varying mechanism in a default position to hold the intake valve opening timing and the intake valve closing timing at respective predetermined most retarded timings; and
      setting the exhaust valve timing varying mechanism in a default position to hold the exhaust valve opening timing and the exhaust valve closing timing retarded by a predetermined amount from respective predetermined most advanced timings such that a predetermined valve overlap between intake valve and exhaust valve is produced; and
   perform a second operation at the startup of the internal combustion engine, wherein the second operation comprises:
      determining whether or not the intake valve timing varying mechanism and the exhaust valve timing varying mechanism are in their respective default positions;
      outputting a control signal such that the intake valve timing varying mechanism and the exhaust valve timing varying mechanism move to their respective default positions, in response to a determination that the intake valve timing varying mechanism and the exhaust valve timing varying mechanism are not in their respective default positions; and
      outputting a control signal such that the internal combustion engine starts combustion by a fuel injector and an ignition device, in response to a determination that the intake valve timing varying mechanism and the exhaust valve timing varying mechanism are in their respective default positions.

16. The controller as claimed in claim 15, wherein the variable valve actuating apparatus is adapted to a direct fuel injection internal combustion engine in which a fuel is injected directly into a combustion chamber.

17. A controller for controlling a variable valve actuating apparatus for an internal combustion engine, wherein the variable valve actuating apparatus comprises: an intake valve operating angle varying mechanism arranged to vary an intake valve operating angle of the internal combustion engine, and an exhaust valve timing varying mechanism arranged to vary an exhaust valve opening timing and an exhaust valve closing timing of the internal combustion engine, while holding constant an exhaust valve operating angle of the internal combustion engine; the controller comprising a section configured to:
   perform a first operation before startup of the internal combustion engine after a stop of the internal combustion engine, wherein the first operation comprises:
      setting the intake valve operating angle varying mechanism in a default position to hold an intake valve closing timing of the internal combustion engine at or near bottom dead center; and
      setting the exhaust valve timing varying mechanism in a default position to hold the exhaust valve opening timing and the exhaust valve closing timing retarded by a predetermined amount from respective predetermined most advanced timings such that a predetermined valve overlap between intake valve and exhaust valve is produced; and
   perform a second operation at the startup of the internal combustion engine, wherein the second operation comprises:
      determining whether or not the intake valve operating angle varying mechanism and the exhaust valve timing varying mechanism are in their respective default positions;
      outputting a control signal such that the intake valve operating angle varying mechanism and the exhaust valve timing varying mechanism move to their respective default positions, in response to a determination that the intake valve operating angle varying mechanism and the exhaust valve timing varying mechanism are not in their respective default positions; and outputting a control signal such that the internal combustion engine starts combustion by a fuel injector and an ignition device, in response to a determination that the intake valve operating angle varying mechanism and the exhaust valve timing varying mechanism are in their respective default positions.

18. The controller as claimed in claim 17, wherein the intake valve operating angle varying mechanism is arranged to hold the intake valve operating angle at a predetermined middle value between a predetermined maximum value and a predetermined minimum value such that the intake valve closing timing is held at or near bottom dead center when in the default position of the intake valve operating angle varying mechanism.

19. The controller as claimed in claim 18, wherein the intake valve operating angle varying mechanism includes at least two opposite biasing devices arranged to bias the intake valve operating angle in two opposite directions such that the intake valve operating angle is held at the predetermined middle value.

20. The controller as claimed in claim 17, wherein the intake valve operating angle varying mechanism is arranged to hold the intake valve operating angle at a predetermined value closer to a predetermined minimum value than to a predetermined maximum value such that the intake valve closing timing is held at or near bottom dead center when in the default position of the intake valve operating angle varying mechanism.

21. The controller as claimed in claim 17, wherein the intake valve operating angle varying mechanism includes at least one biasing device arranged to bias the intake valve operating angle such that the intake valve closing timing is held at or near bottom dead center when in the default position of the intake valve operating angle varying mechanism.

22. The controller as claimed in claim 17, wherein the exhaust valve timing varying mechanism is arranged to hold the exhaust valve opening timing and the exhaust valve closing timing at respective predetermined most retarded timings when in the default position of the exhaust valve timing varying mechanism.

23. The controller as claimed in claim 17, wherein the variable valve actuating apparatus is adapted to a direct fuel injection internal combustion engine in which a fuel is injected directly into a combustion chamber.

* * * * *